(12) United States Patent
Albertini Diaferia

(10) Patent No.: US 12,531,402 B2
(45) Date of Patent: Jan. 20, 2026

(54) SETS OF MODULAR RACEWAYS FOR STRUCTURED OPTICAL-FIBER CABLING

(71) Applicant: Flávio Albertini Diaferia, São Paulo (BR)

(72) Inventor: Flávio Albertini Diaferia, São Paulo (BR)

( * ) Notice: Subject to any disclaimer, the term of this patent is extended or adjusted under 35 U.S.C. 154(b) by 502 days.

(21) Appl. No.: 17/912,584

(22) PCT Filed: Mar. 17, 2021

(86) PCT No.: PCT/BR2021/050110
§ 371 (c)(1),
(2) Date: Feb. 15, 2023

(87) PCT Pub. No.: WO2021/184098
PCT Pub. Date: Sep. 23, 2021

(65) Prior Publication Data
US 2024/0295712 A1    Sep. 5, 2024

(30) Foreign Application Priority Data

Mar. 18, 2020    (BR) .......................... 102020005429-5

(51) Int. Cl.
*H02G 3/06*       (2006.01)
*G02B 6/44*       (2006.01)

(52) U.S. Cl.
CPC ......... *H02G 3/0608* (2013.01); *G02B 6/4459* (2013.01)

(58) Field of Classification Search
CPC .................................................. G02B 6/4459
See application file for complete search history.

(56) References Cited

U.S. PATENT DOCUMENTS

| | | | | |
|---|---|---|---|---|
| 2,834,622 A * | 5/1958 | Reeves | ................ | H02G 3/0608 248/68.1 |
| 5,271,585 A * | 12/1993 | Zetena, Jr. | ............. | H02G 3/263 174/95 |
| 5,937,131 A * | 8/1999 | Haataja | ................ | H02G 3/0608 385/136 |
| 7,848,608 B2 * | 12/2010 | Owens | ................ | G02B 6/4459 385/134 |
| 2002/0096606 A1 * | 7/2002 | Bernard | ............... | H02G 3/0608 248/68.1 |
| 2004/0124321 A1 * | 7/2004 | Kampf | ..................... | H04Q 1/06 248/68.1 |
| 2006/0013552 A1 * | 1/2006 | Wentworth | .......... | G02B 6/4439 385/134 |
| 2006/0269210 A1 * | 11/2006 | Waszak | ................ | G02B 6/4459 385/136 |
| 2007/0092196 A1 * | 4/2007 | Bayazit | ................ | G02B 6/4459 385/136 |

* cited by examiner

*Primary Examiner* — Thomas A Hollweg
*Assistant Examiner* — Marc E Manheim
(74) *Attorney, Agent, or Firm* — AlphaPatent Associates Ltd.; Daniel J. Swirsky

(57) ABSTRACT

The invention relates to a set of modular raceways (10) for structured optical-fiber cabling and installation in data centers, telecommunication rooms, wiring rooms and the like, the raceways (10) comprising expandable modules (20), (30), (40), (50), (60), (70), (80), (90), (110), (111) and (112) formed by at least one central profile (11) with pairs of longitudinal connections (CLI) and (CL2) for coupling to end profiles (13).

4 Claims, 27 Drawing Sheets

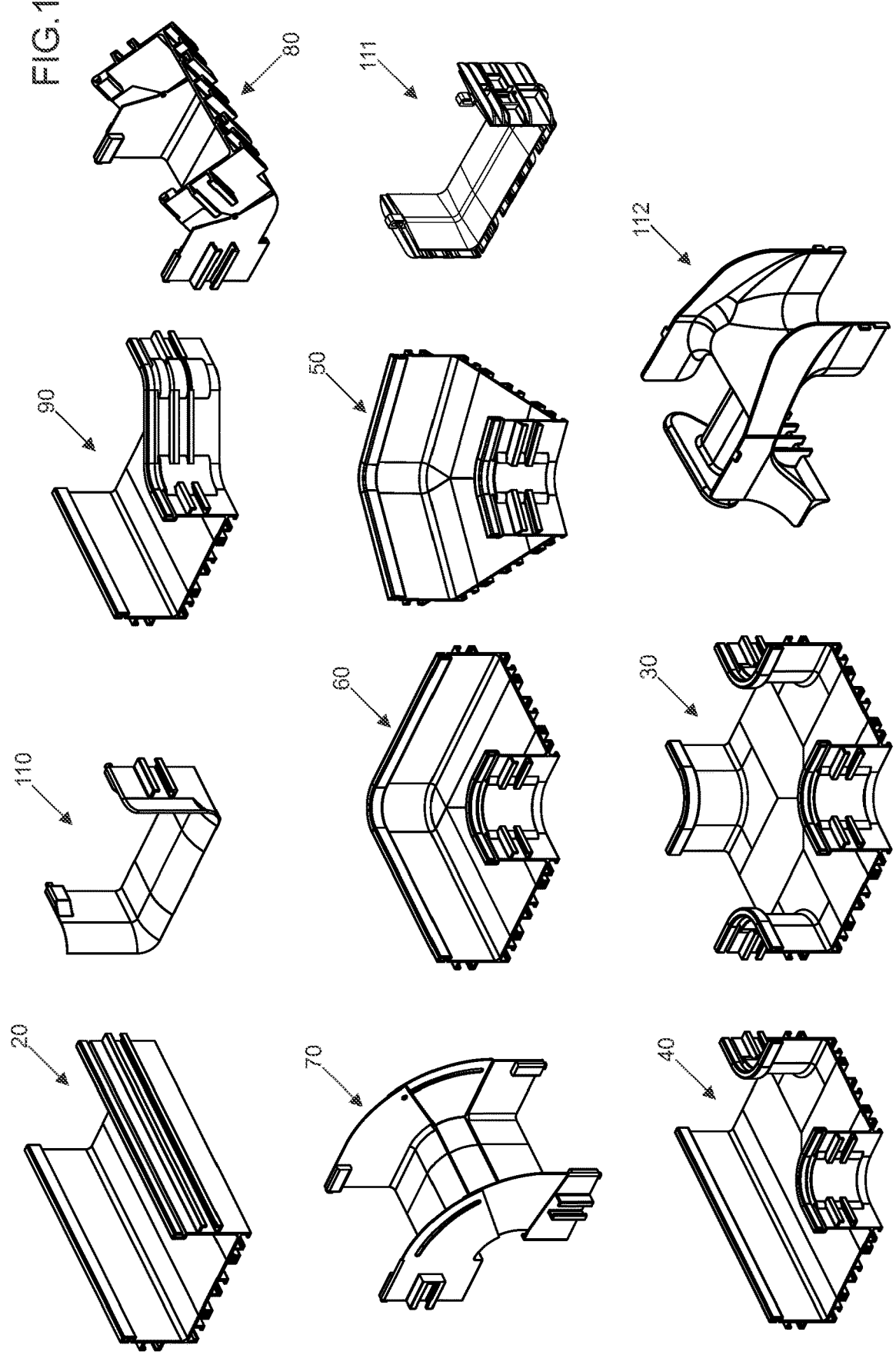

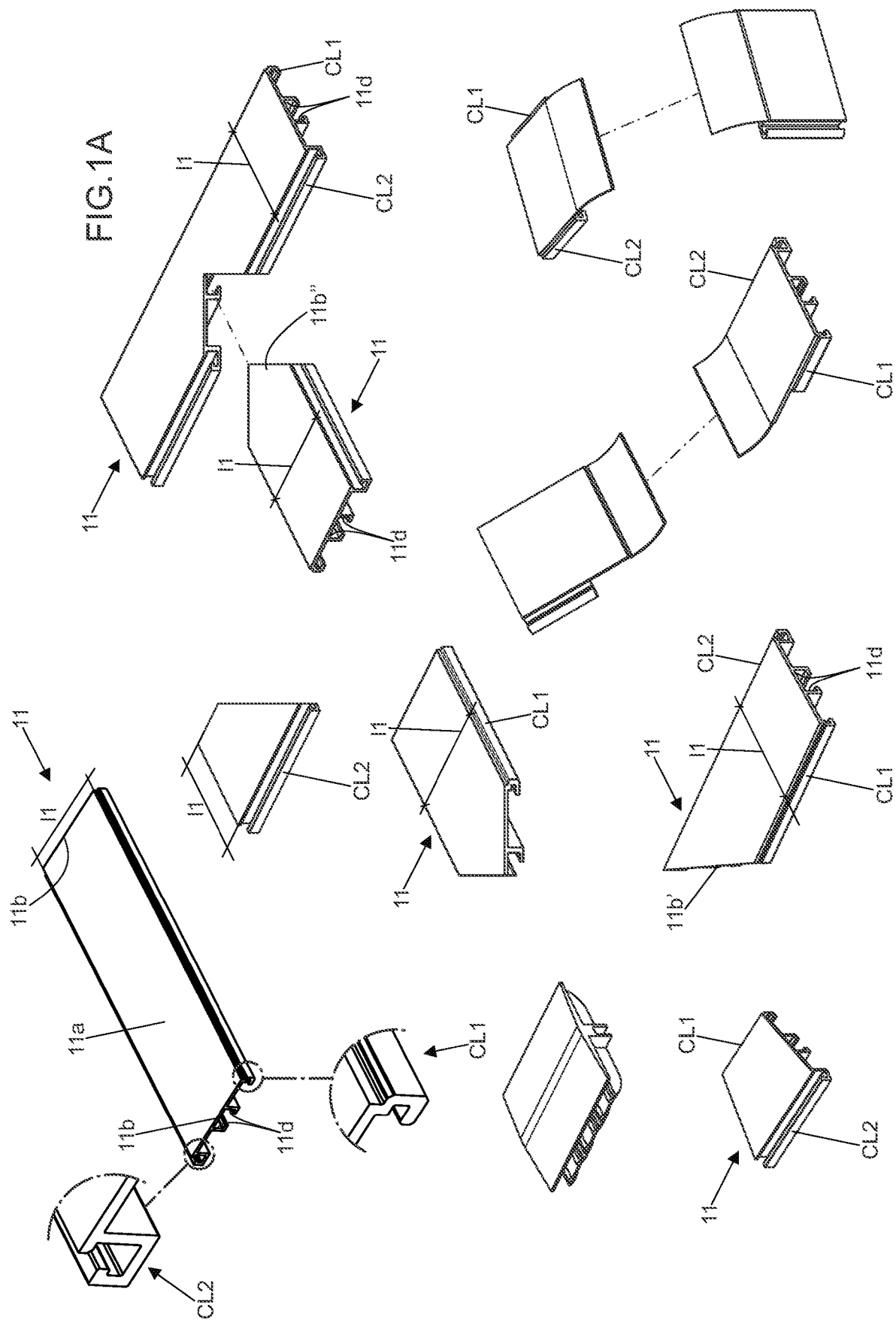

CROSS-SECTION A.A

CROSS-SECTION B.B

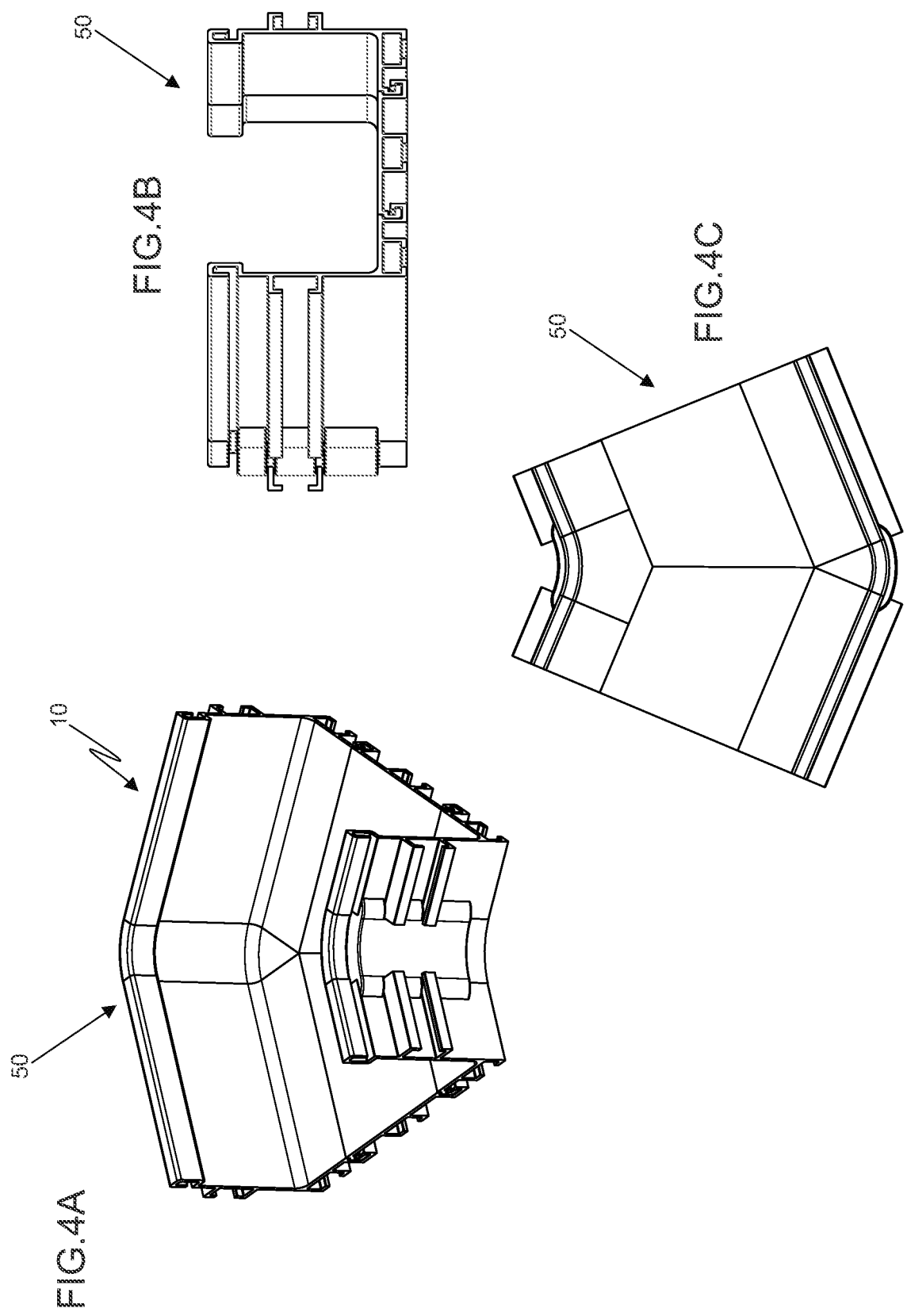

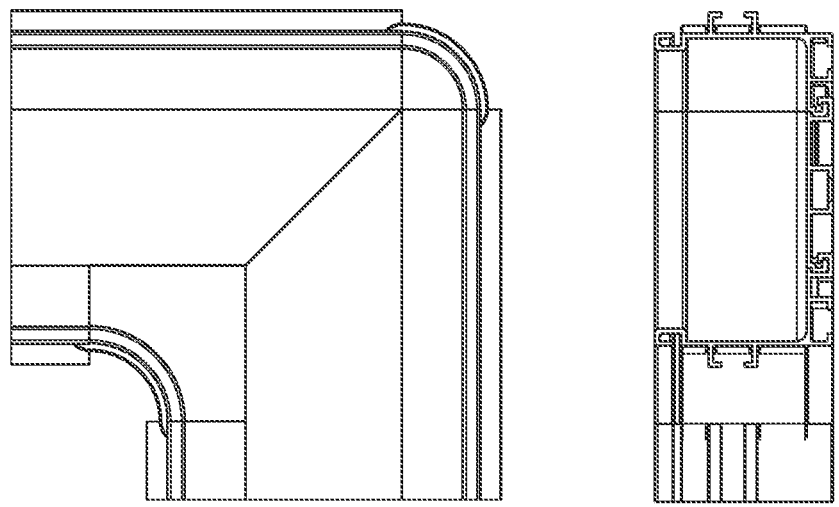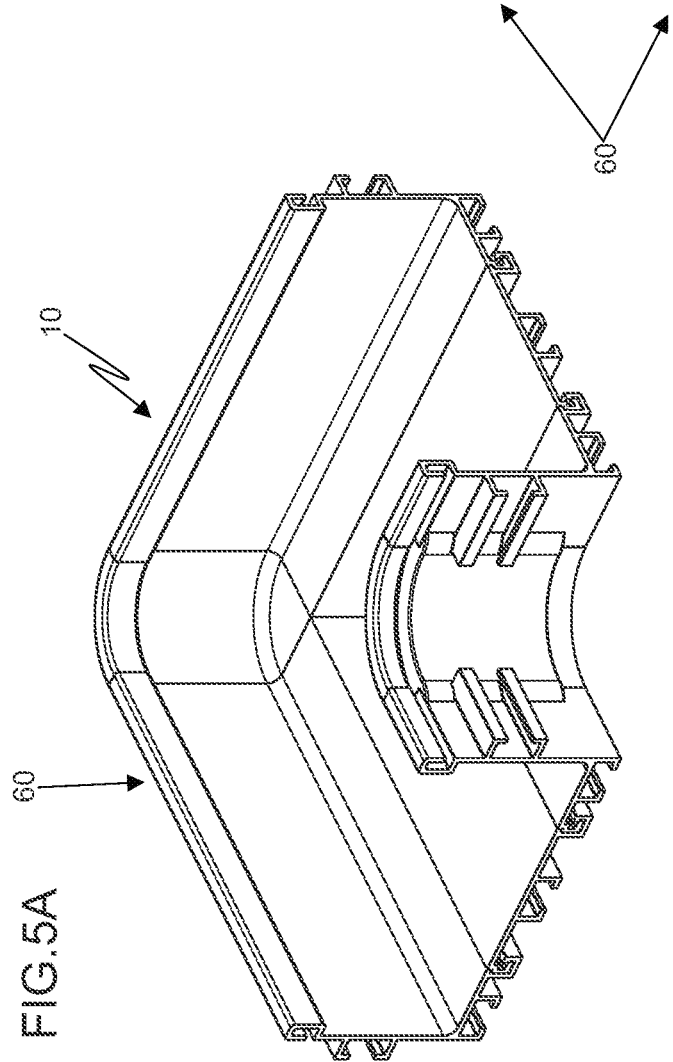

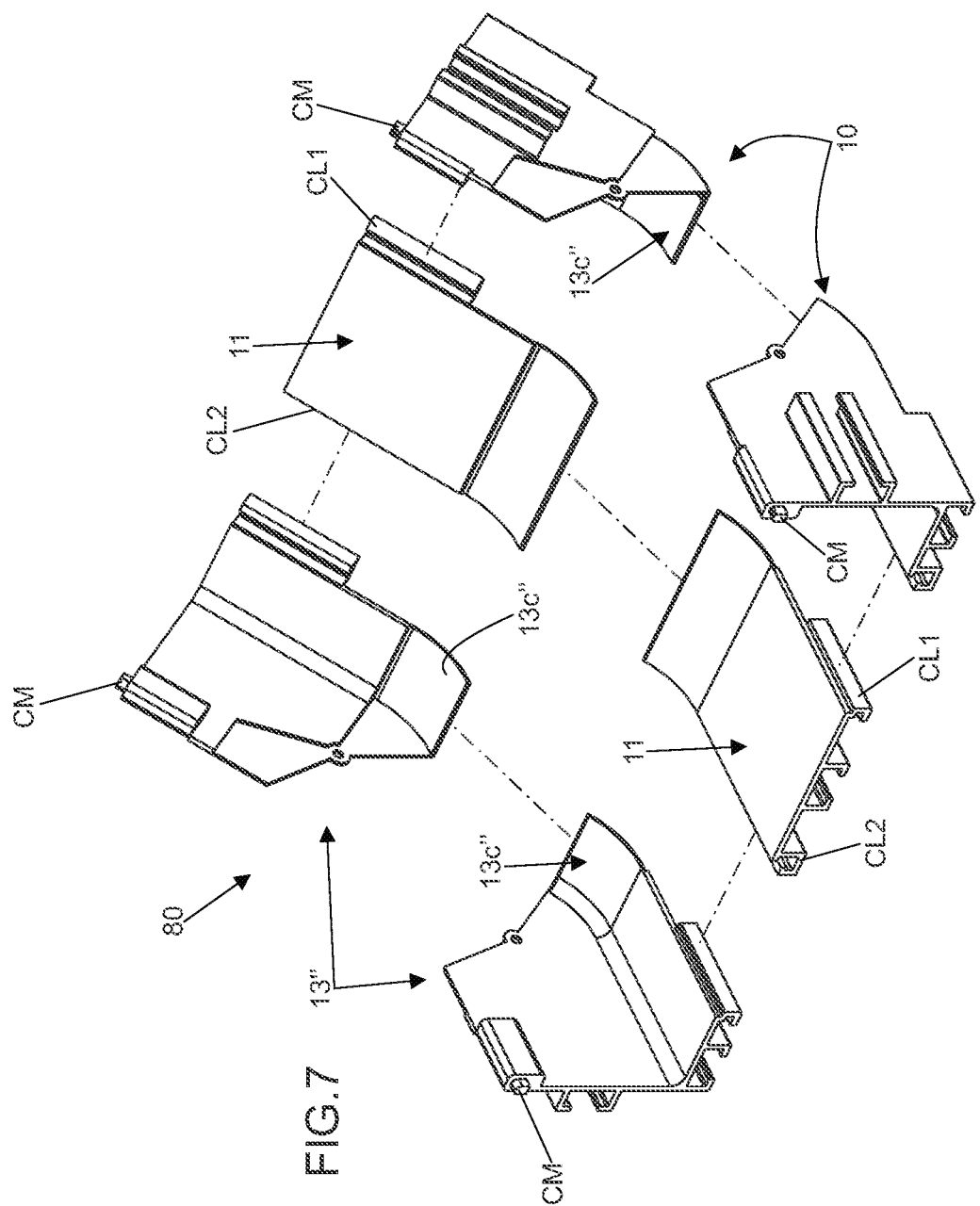

SETS OF MODULAR RACEWAYS FOR STRUCTURED OPTICAL-FIBER CABLING

TECHNICAL FIELD OF THE INVENTION

The present invention patent deals with a set of modular beds for structured fiber optic wiring installed in 'Data Centers', telecommunications rooms, wiring cabins, among other similar environments where, notably, said set of beds comprise multiple pieces modular, each one equipped with a connection/coupling that allows the expansion or reduction of the useful area of reception of the wiring, adapting to the installation surfaces, regardless of the angulations, as well as these beds present distribution, protection and segregation capacity of the cables of fiber optic, thus guaranteeing their safety and concealment during storage and, at the same time, valuing the aesthetic composition of the environment.

BACKGROUND OF THE INVENTION

As is known, optical structured wiring is used to transmit information through optical fiber through light signals, instead of electrical signals. It is a very advantageous and low-cost solution, which guarantees greater speed in communication networks, since the propagated signals are not interfered with by electrical generators, motors, high power electrical lines, lightning. Optical structured wiring is also widely used in data centers, as it provides high-speed information transmission in telecommunications networks, which provides unlimited virtual bandwidth.

Thus, the standardization of structured wiring is extremely important, since it allows system management, enables connectivity between products from different manufacturers, as well as allows adherence to international standards for Structured Wiring as an Organization International Standard for Standardization—ISO—, Electronic Industry Association—EIA—, Telecommunications Industry Association—TIA—, American National Standards Institute, specifically, ANSI/TIA-568.3-D which is a specific standard that establishes performance requirements and transmission for fiber optic cables, connectors, connecting hardware and patch cords.

One of the ways used in the market for the standardization of the network infrastructure with optical fiber is the use of beds to accommodate the cables, and said beds are comprised of modules, generally formed in a single piece of cross section in 'U' and made of polymers, such as Acrylonitrile Butadiene Styrene—ABS—and Polyvinyl Chloride—PVC—or metals, such as Aluminum Alloys, in addition to other materials.

It happens that the modules that make up the conventional beds formed by single pieces do not offer the possibility of expansion or adjustments according to the need for application at the place of installation of the structured wiring and, consequently, in case of expansion of networks, replacement is necessary. of the entire line of beds, thus making conventional beds inefficient and costly.

To facilitate the adaptation of beds, there are currently models of modular beds on the market as presented in document no. US2004124321 which deals with a telecommunications cable management system that includes a flat base element, including a flat top surface and side edges. The side elements are mounted in an arrangement corresponding to the base element. Side elements may include one or more of the following: standing wall portions, horizontally extending side outlets and gutters. The base elements and the upper wall portions can have a continuous cross section and can be cut to the desired length for the cable management system. The outlet sides can also include various components where a central section of each can be cut to the desired width.

Another document no. US2007092196 is a telecommunications cable management system that includes gutter elements including a flat top surface and sides for routing and managing cables. The trough elements are made of separate parts assembled together with a coupling arrangement. The docking arrangement allows for the assembly of the system in place, such as fitting the parts together. The trough elements are then brought together to form the cable management system.

Although the aforementioned documents configure beds formed by modular parts with a fitting system, the connections/couplings, as well as the composition of the modulation, differ from the present invention in question, as will be seen below, thus ensuring that it fully meets the legal requirements of patentability.

OBJECTIVES OF THE INVENTION

The purpose of the invention patent is to present a set of modular beds for structured fiber optic wiring installed in 'Data Centers', telecommunications rooms, wiring cabins, among other similar environments, and said set of beds are formed by multiple modular pieces that can be attached to each other that allow the expansion or reduction of the useful area for the reception of the wiring, adapting the infrastructure to the installation surfaces, regardless of angles and dimensions.

It is another objective of the invention patent to present a set of modular beds formed by expandable modules comprised of profiles equipped with longitudinal connections and locking connections that allow the expansion of the total width of the module, which can be from 20 to 150 mm and all understood multiples, in order to offer expansions capable of meeting several useful dimensions.

Another objective of the invention patent is to present expandable modules provided with male-type connections and expandable modules provided with female-type connections whose construction is simplified and easy to assemble, in order to meet specific applications such as adaptation in ' layouts' of different rooms, adaptation to positions of different equipment and adaptation in relation to the amount of cables.

It is also the objective of the invention patent to present a set of modular beds formed by modules that, due to the ease of assembly through connections and expansion or reduction adjustment, the wiring infrastructure can be performed even after the beds lines assembled offering the applications in addition to ease, practicality and speed to suit great savings.

DESCRIPTION OF THE FIGURES

To complement the present description in order to obtain a better understanding of the characteristics of the present invention and in accordance with a preferred practical embodiment of the same, the attached description is accompanied by a set of drawings, where, in an exemplified way, although non-limiting, its operation was represented:

FIG. 1 represents a perspective view of the set of bed modules in question;

FIG. 1A illustrates perspective views of the central profile models that make up the bed modules illustrated in FIG. 1;

FIGS. 4A, 4B and 4C show mounted, side and top perspective views of the 45° curved-type expandable module;

FIGS. 5A, 5B and 5C show mounted, side and top perspective views of the 90° curved-type expandable module;

FIG. 7 illustrates an exploded perspective view of the elements that make up the expandable module of the 90° to 45° rise type;

DESCRIPTION OF THE INVENTION

Figure 2:
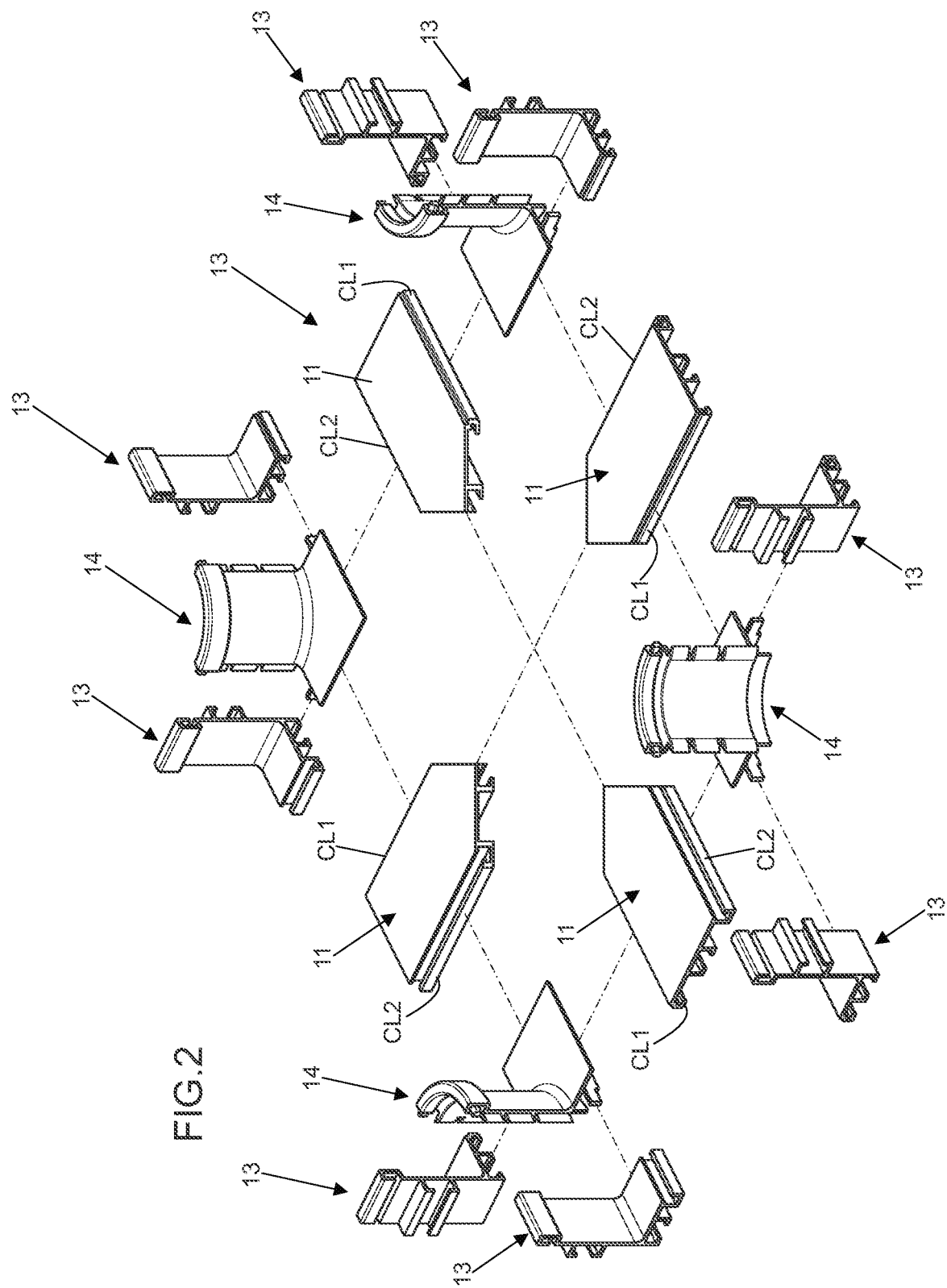
FIG. 2 shows an exploded perspective view of the elements that make up the expandable module of the crosshead type.
Figure 2A:
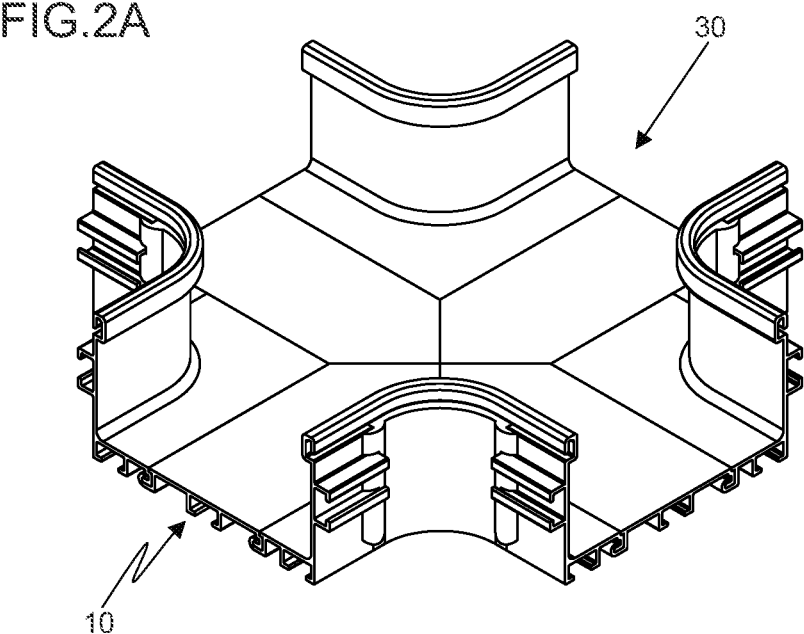
FIGS. 2A and 2B show mounted and side perspective views of the crosshead expandable module.
Figure 2B:
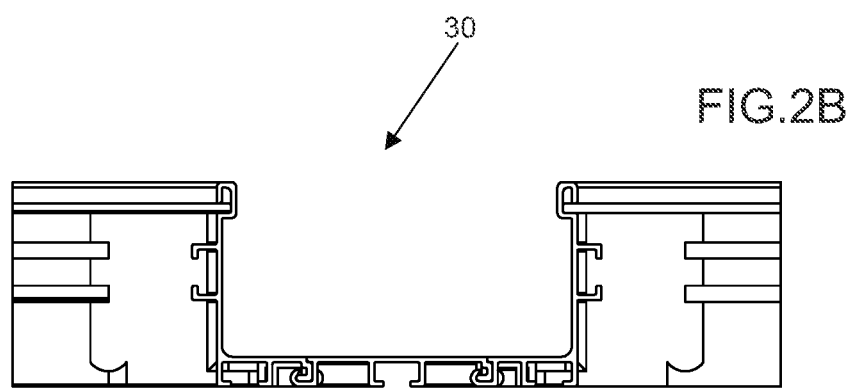
Figure 3:
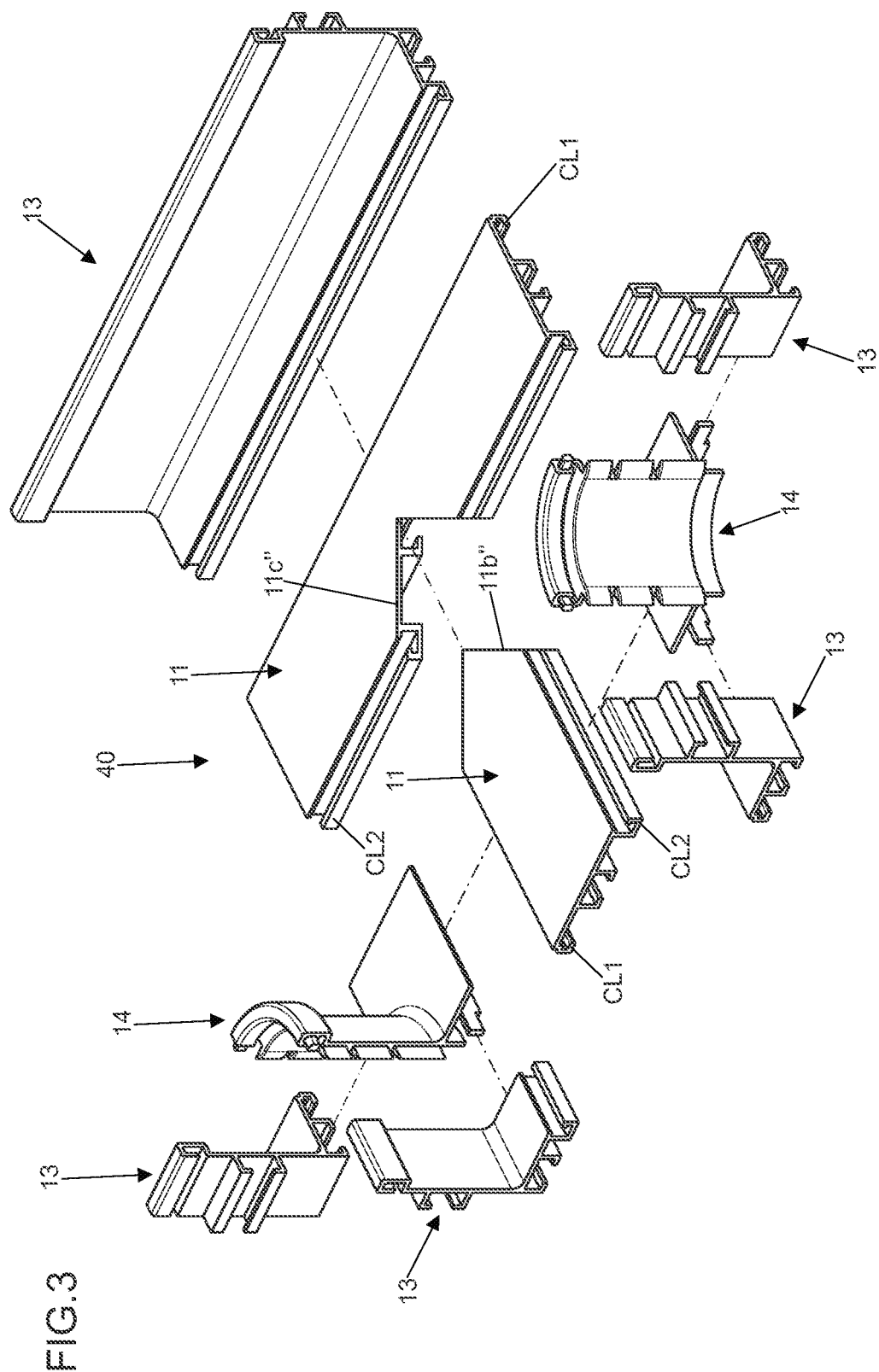
FIG. 3 reveals an exploded perspective view of the elements that make up the expandable module of the 'T' branch type.
Figure 3A:
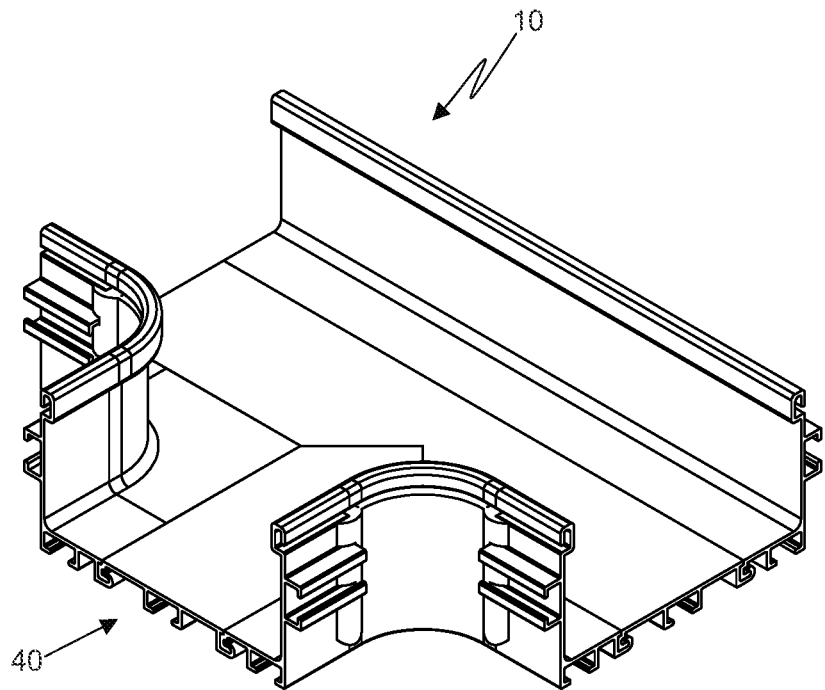
FIGS. 3A and 3B illustrate mounted and side perspective views of the 'T' branch expandable module.
Figure 3B:
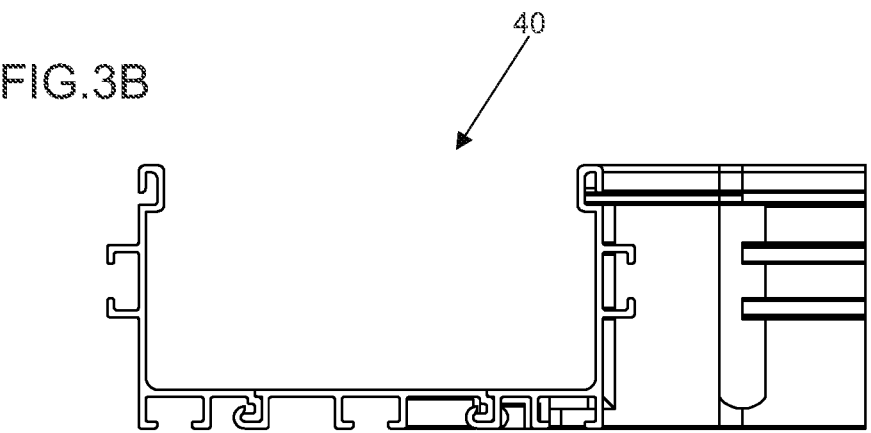
Figure 4:
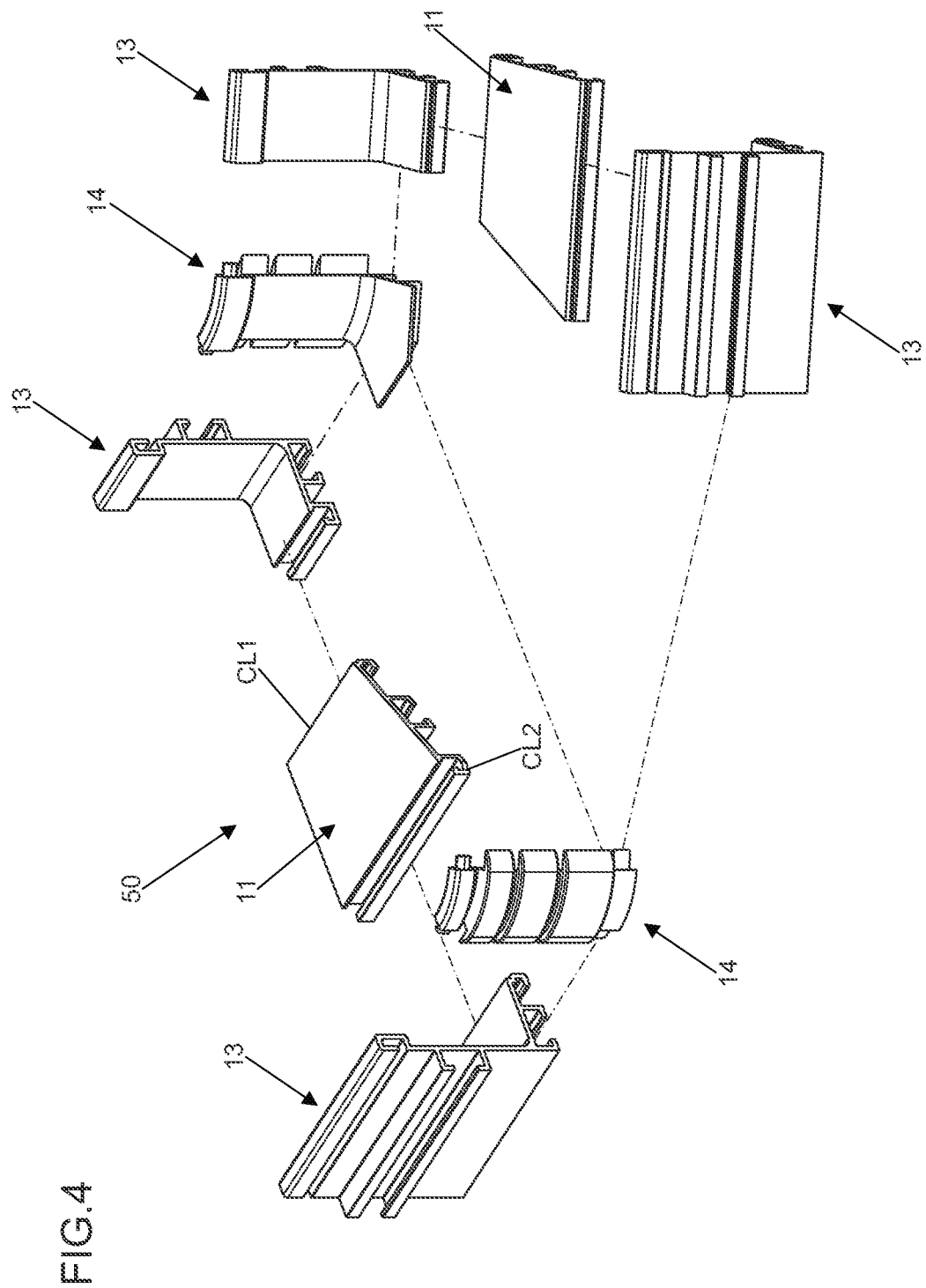
FIG. 4 represents an exploded perspective view of the elements that make up the 45° curved expandable module.
Figure 5:
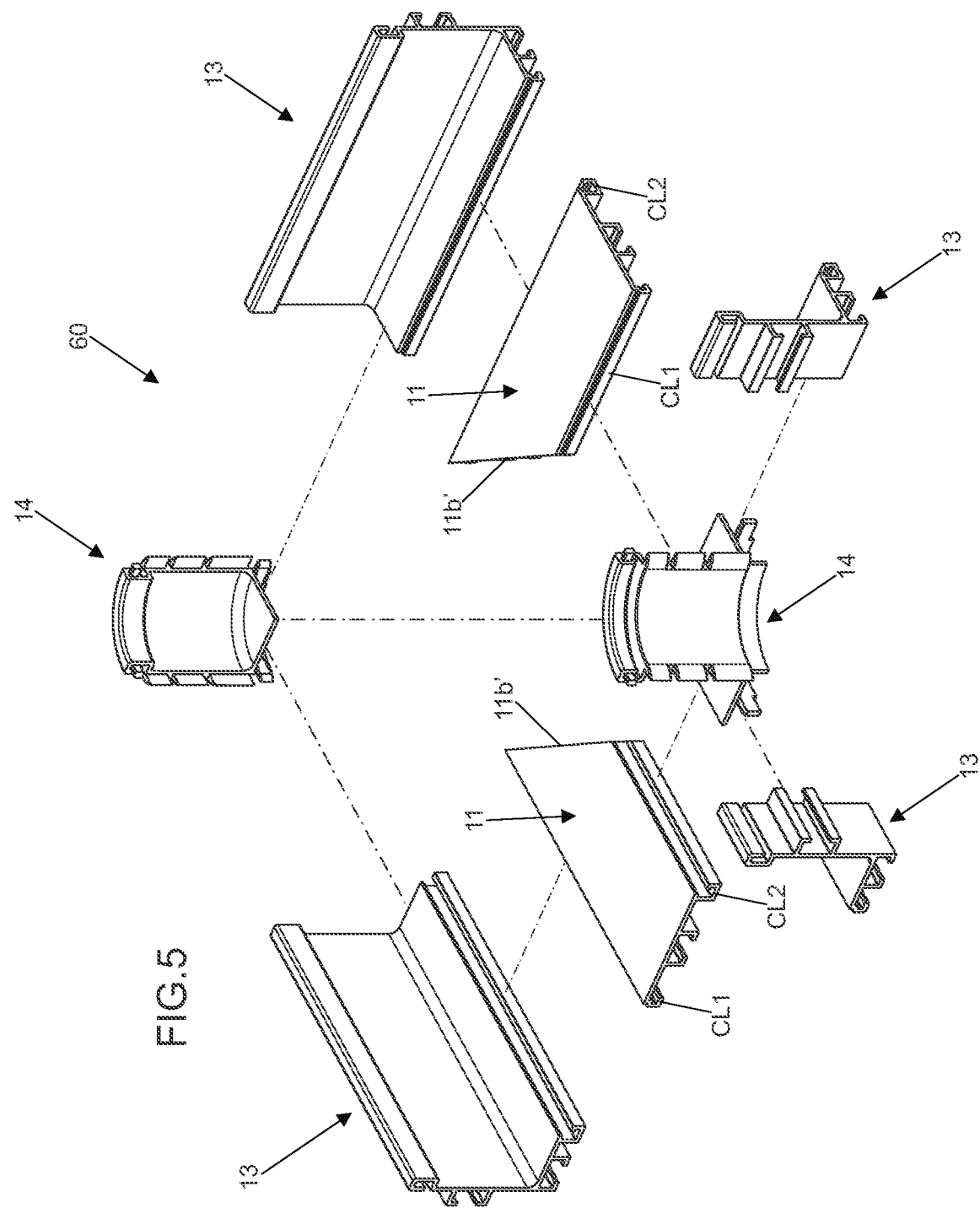
FIG. 5 shows an exploded perspective view of the elements that make up the 90° curved expandable module.
Figure 6:
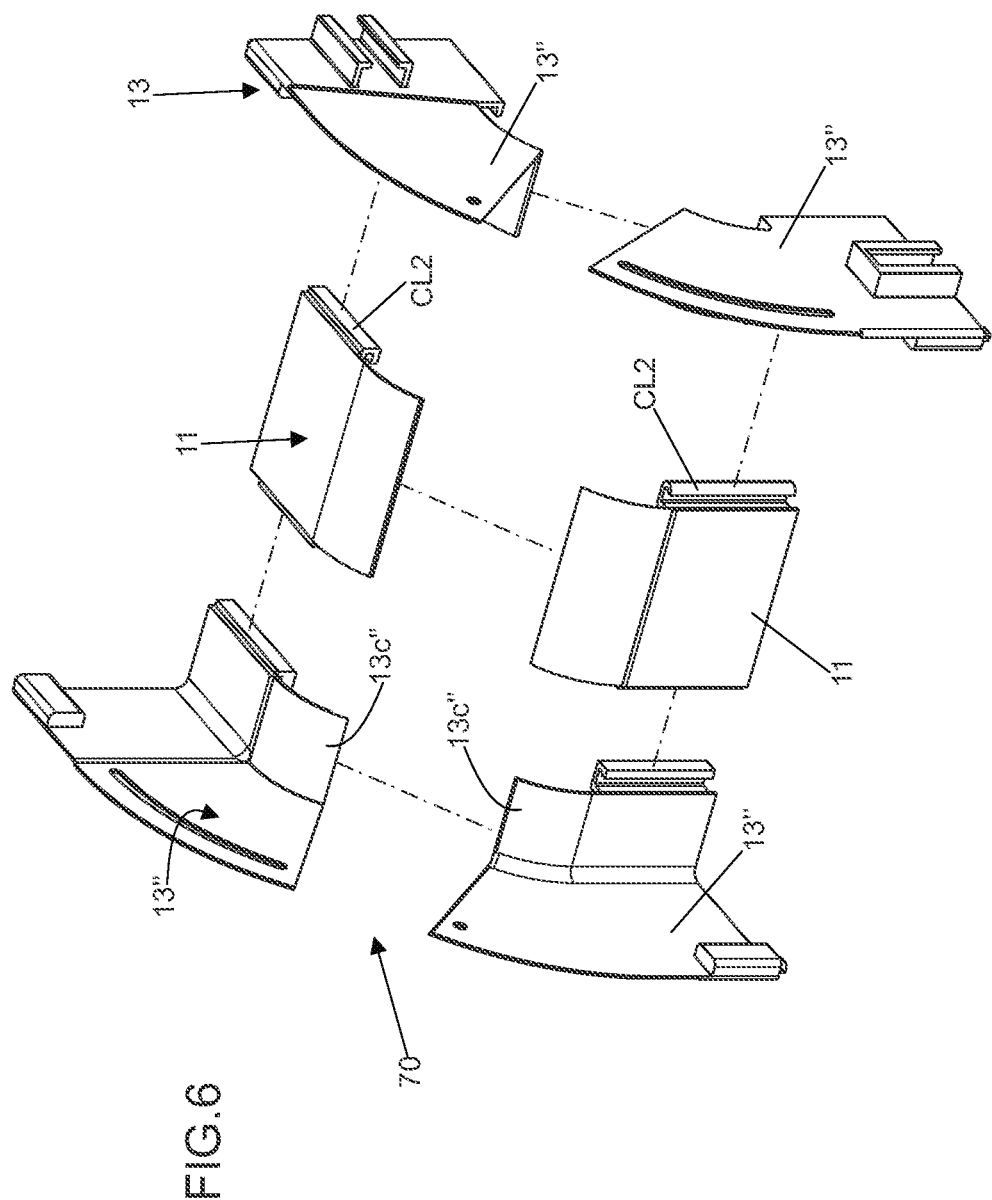
FIG. 6 shows an exploded perspective view of the elements that make up the expandable module of the descent type 90° to 45°.
Figure 6A:
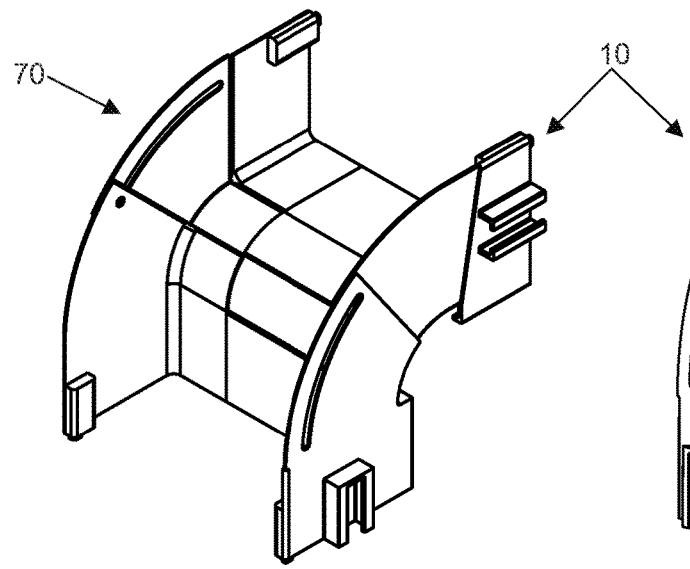
FIGS. 6A, 6B, 6C and 6D represent views in mounted front perspective, mounted rear perspective, front and side view of the expandable module of the descent type 90° to 45°.
Figure 6B:
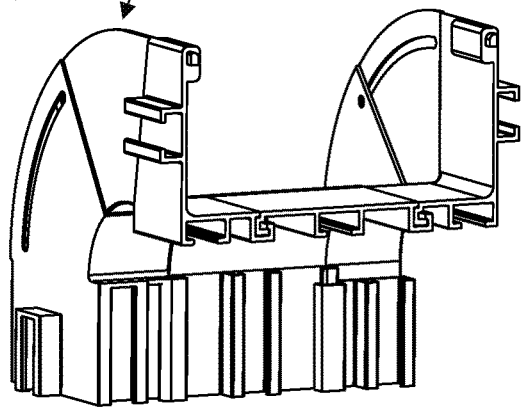
Figure 6C:
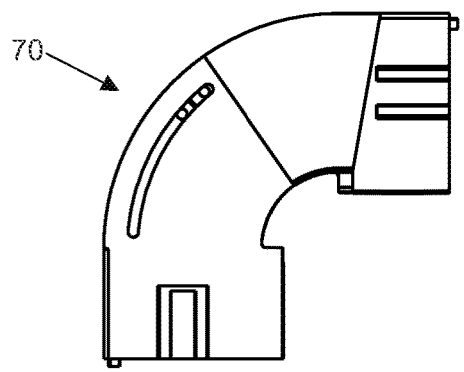
Figure 6D:
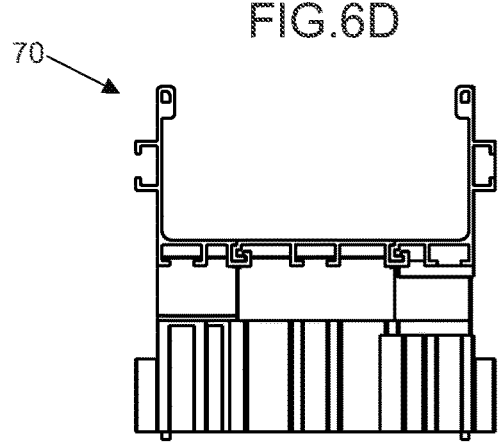
Figure 7A:
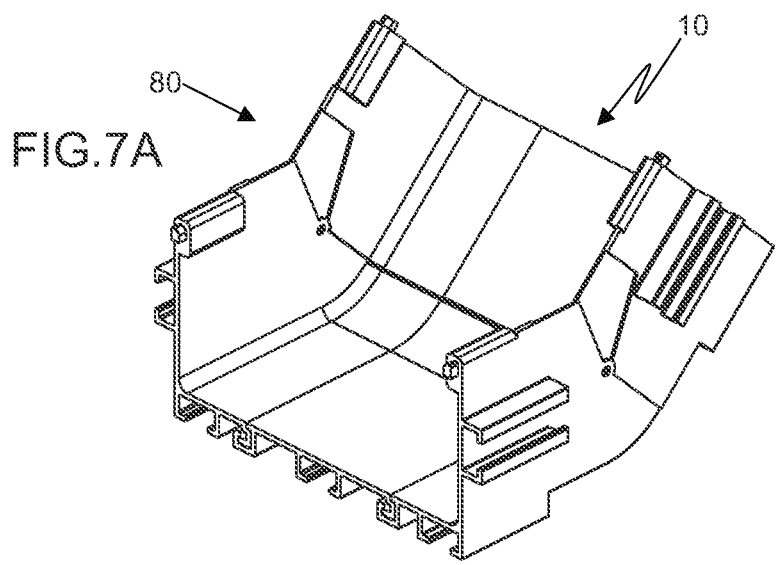
FIGS. 7A, 7B and 7C illustrate mounted, side and front perspective views of the 90° to 45° rise-type expandable module, with the respective enlarged detail of the male connection.
Figure 7B:
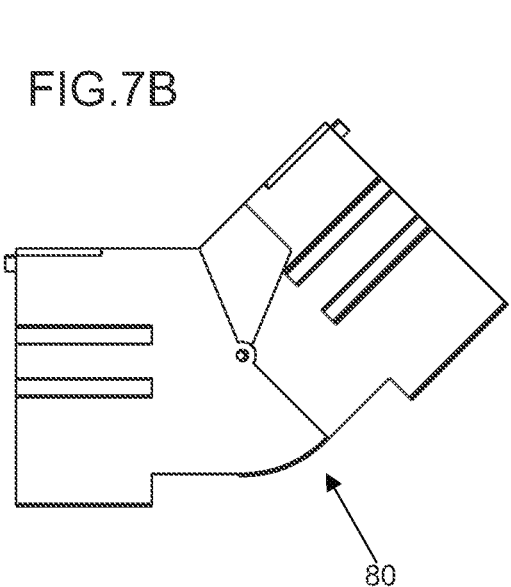
Figure 7C:
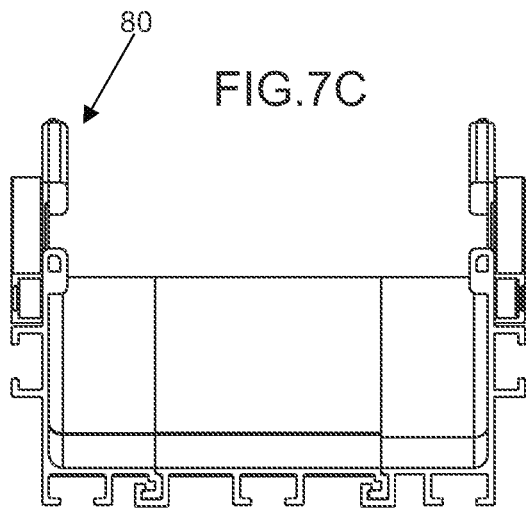
Figure 8:
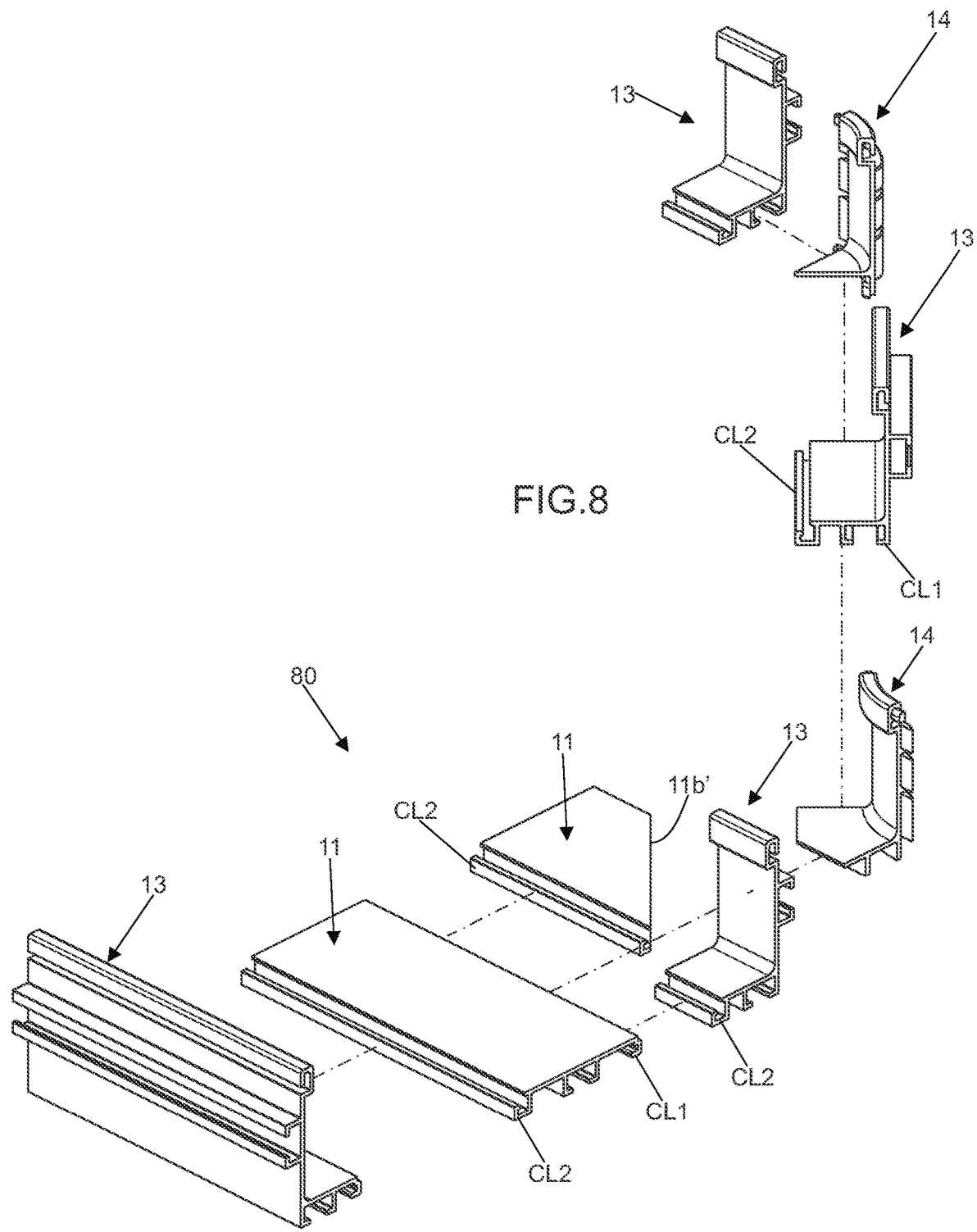
FIG. 8 shows an exploded perspective view of the elements that make up the expandable module of the left reduction type.
Figure 8B:
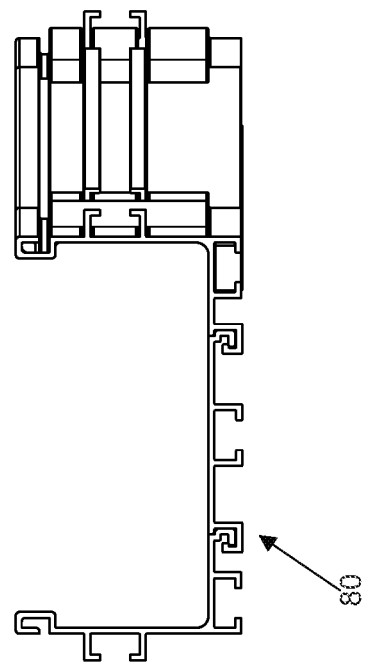
FIGS. 8A, 8B and 8C show mounted perspective views, side and front of the expandable module of the left reduction type.
Figure 8C:
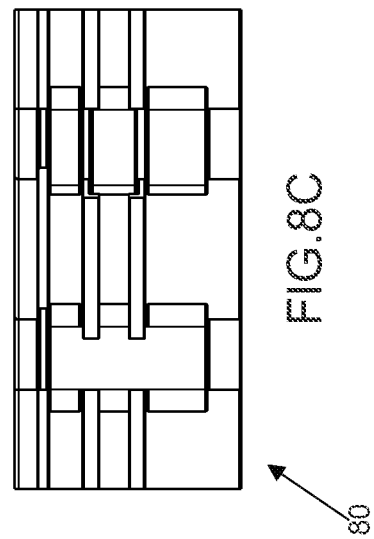
Figure 8A:
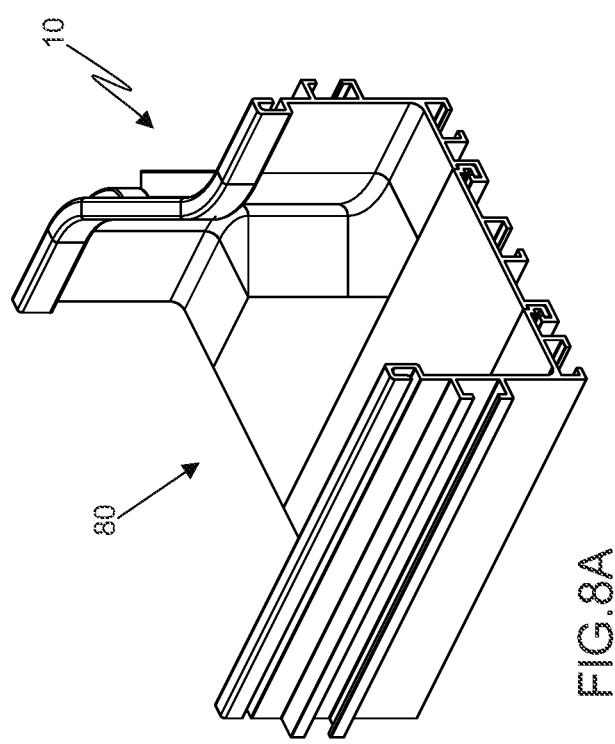
Figure 9:
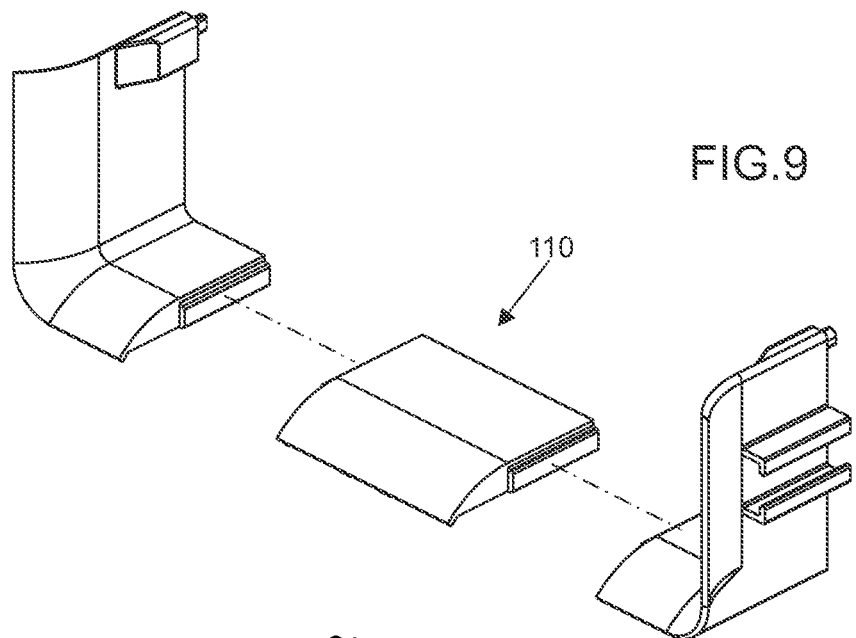
FIG. 9 shows an exploded perspective view of the elements that make up the nozzle-type module.
Figure 9A:
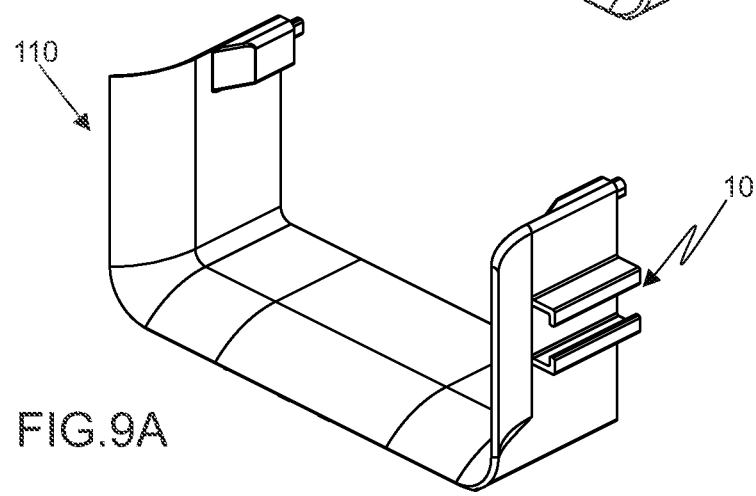
FIGS. 9A and 9B represent mounted and side perspective views of the nozzle-type module.
Figure 9B:
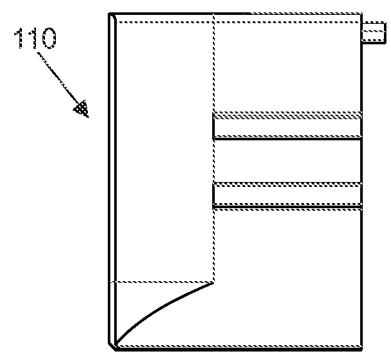
Figure 10:
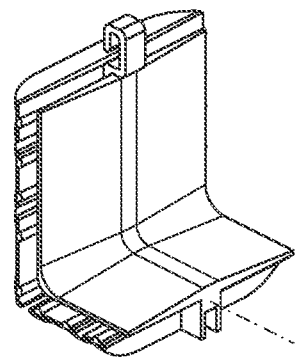
FIG. 10 illustrates an exploded perspective view of the elements that make up the splice-type module.
Figure 10:
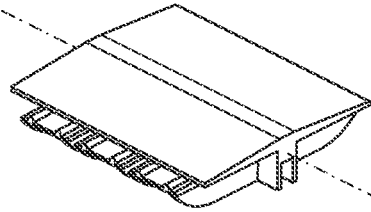
Figure 10:
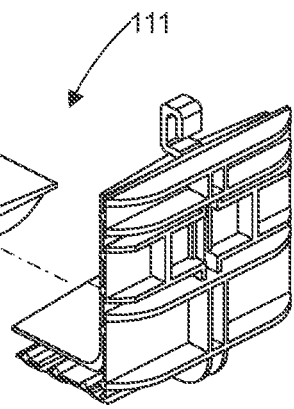
Figure 10A:
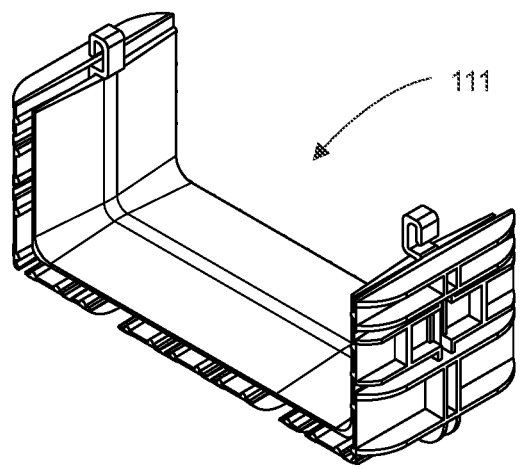
FIGS. 10A and 10B show mounted and side perspective views of the splice-type module.
Figure 10B:
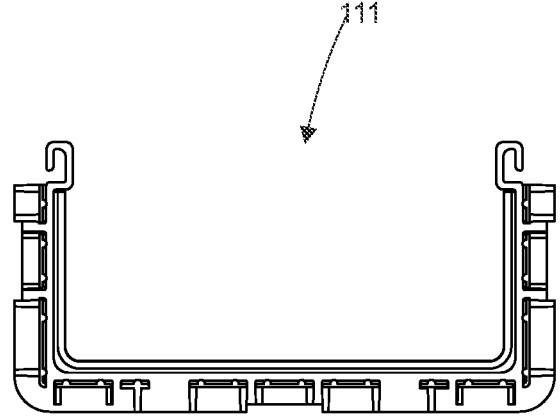
Figure 11A:
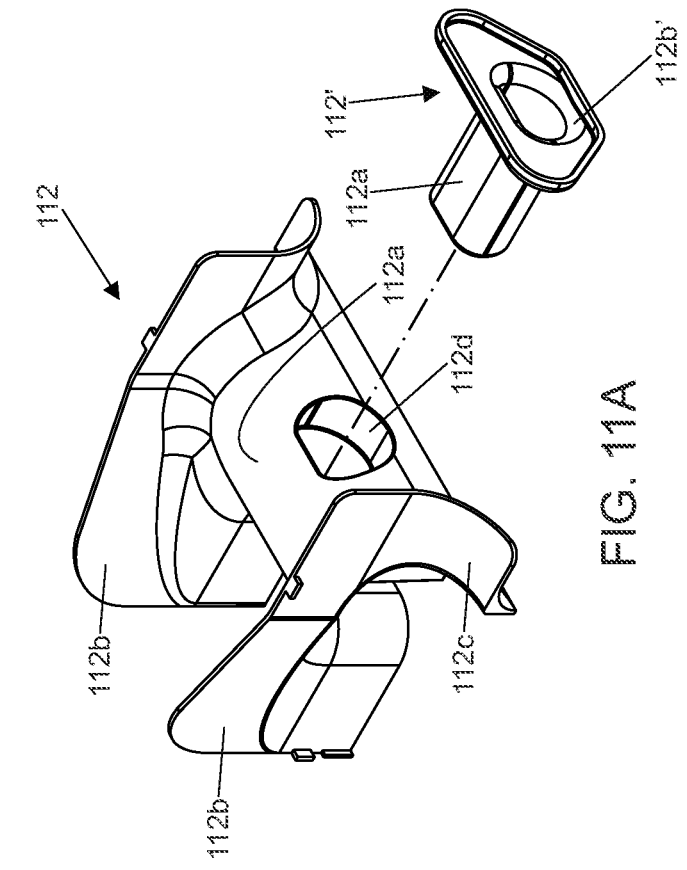
FIGS. 11 and 11A show front and rear exploded perspective views of the elements that make up the drip tray.
Figure 11:
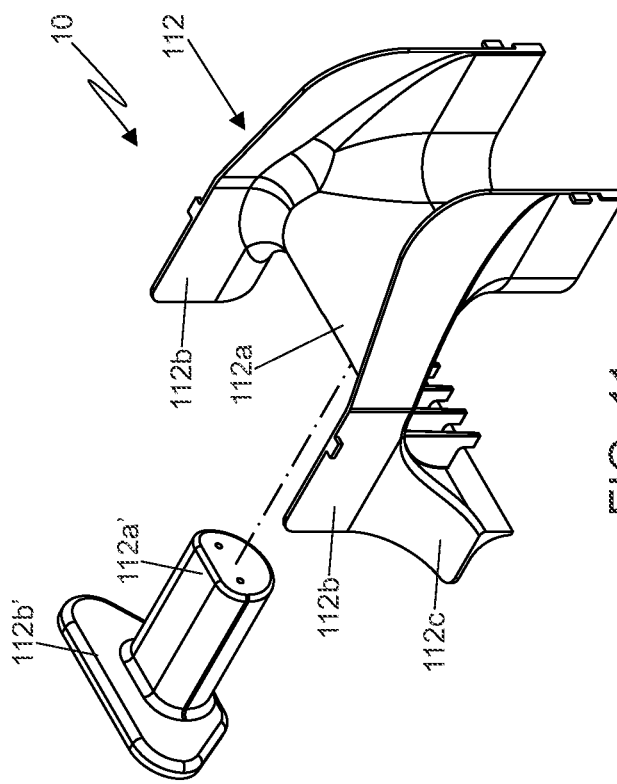
Figure 11C:
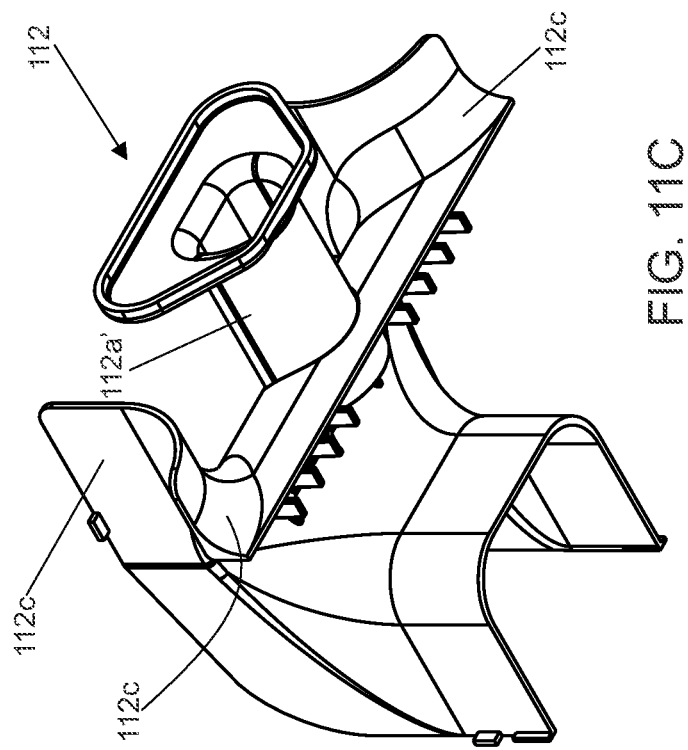
FIGS. 11B and 11C show the front and postero-inferior mounted perspective views.
Figure 11B:
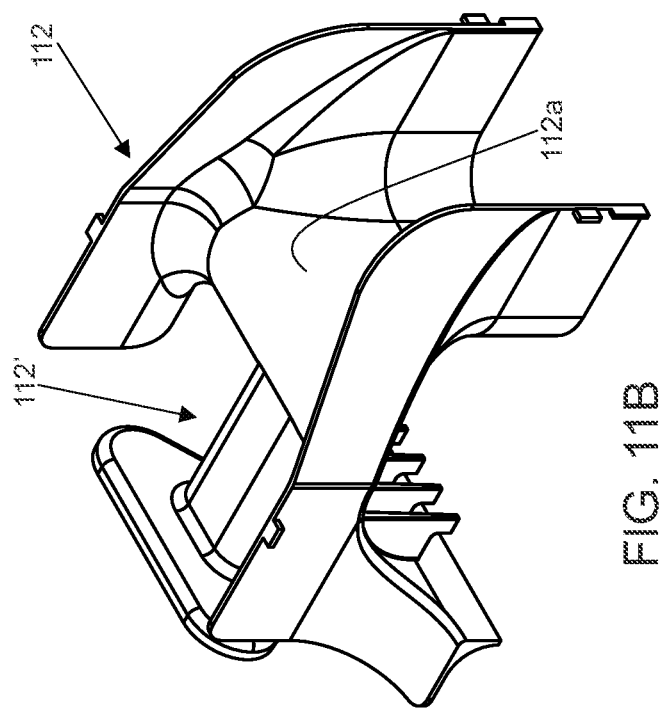
Figure 11D:
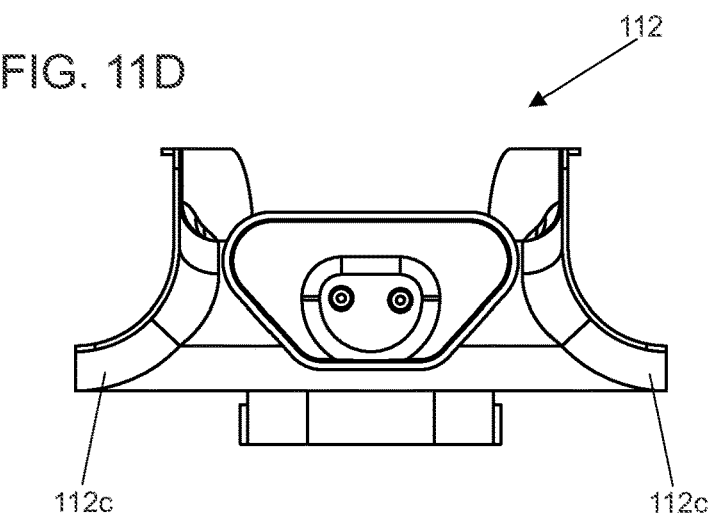
FIGS. 11D, 11E and 11F show rear, side and top views of the drip pan-type expandable module.
Figure 11E:
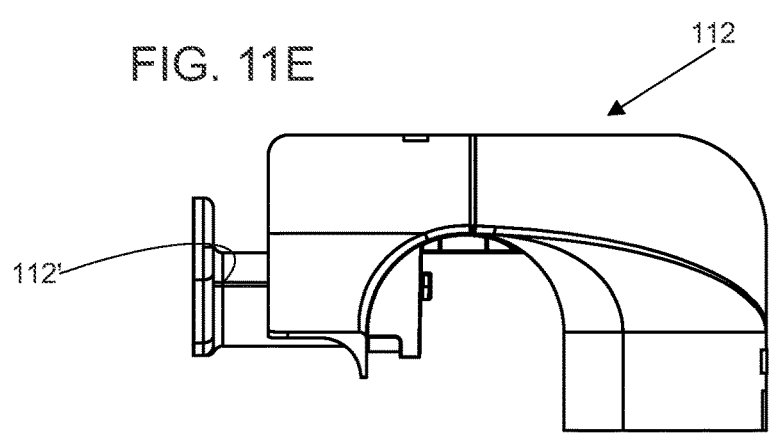
Figure 11F:
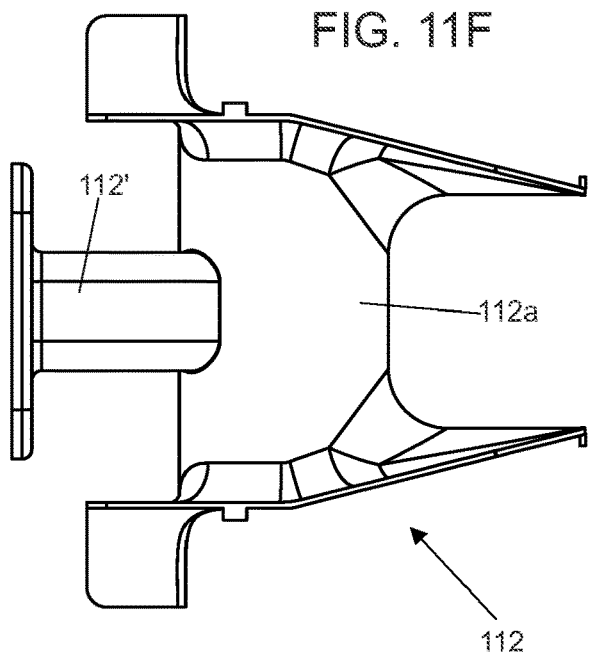
Figure 12:
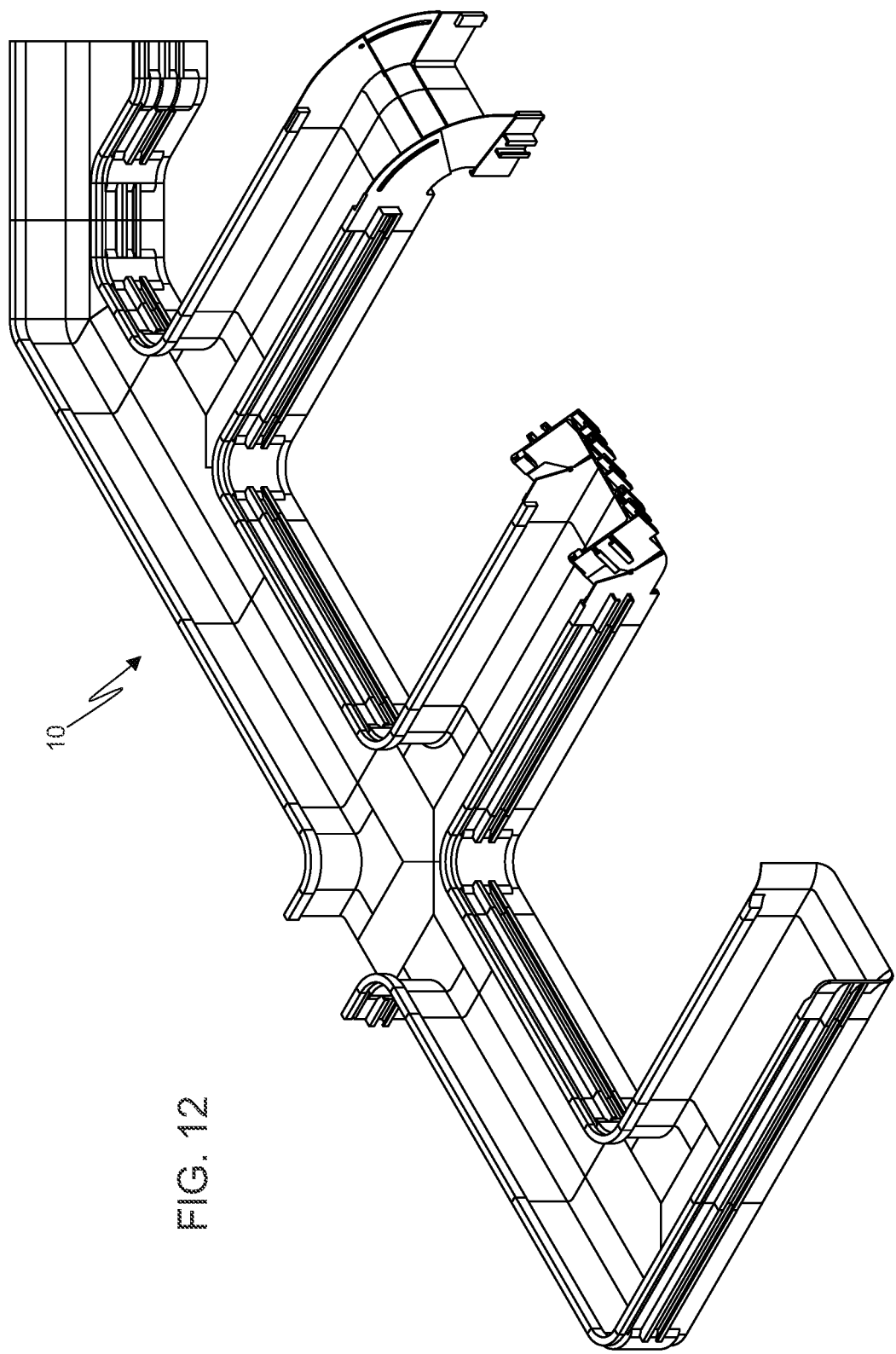
FIG. 12 shows a perspective view of an example of an arrangement obtained from the innovative set of beds.

With reference to the illustrated drawings, the present invention patent refers to an "IMPROVEMENTS IN SET OF MODULAR BEDS FOR STRUCTURED FIBER OPTIC CABLE", more precisely, it is a set of modular beds (10) for structured fiber optic wiring (not illustrated) and installation in 'Data Centers', telecommunications rooms, wiring cabins, among other environments similar. The beds (10) are comprised of: i) bed module (20) (see FIGS. 1D to 1*l*); ii) cross-type module (30) (see FIGS. 2 to 2B); iii) 'T' branch-type module (40) (see FIGS. 3 to 3B); iv) 45° curved module (50) (see FIGS. 4 to 4C); v) 90° curved module (60) (see FIGS. 5 to 5C); vi) 90° to 45° descent module (70) (see FIGS. 6 to 6D); vii) 90° to 45° C. limb type module (80) (see FIGS. 7 to 7C); viii) left reduction type module (90) (see FIGS. 8 to 8C); xiv) nozzle-type module (110) (see FIGS. 9 to 9B); xv) splice-type module (111) (see FIGS. 10 to 10B); xvi) drip tray module (112) (see FIGS. 11 to 11D).

Figure 1B:
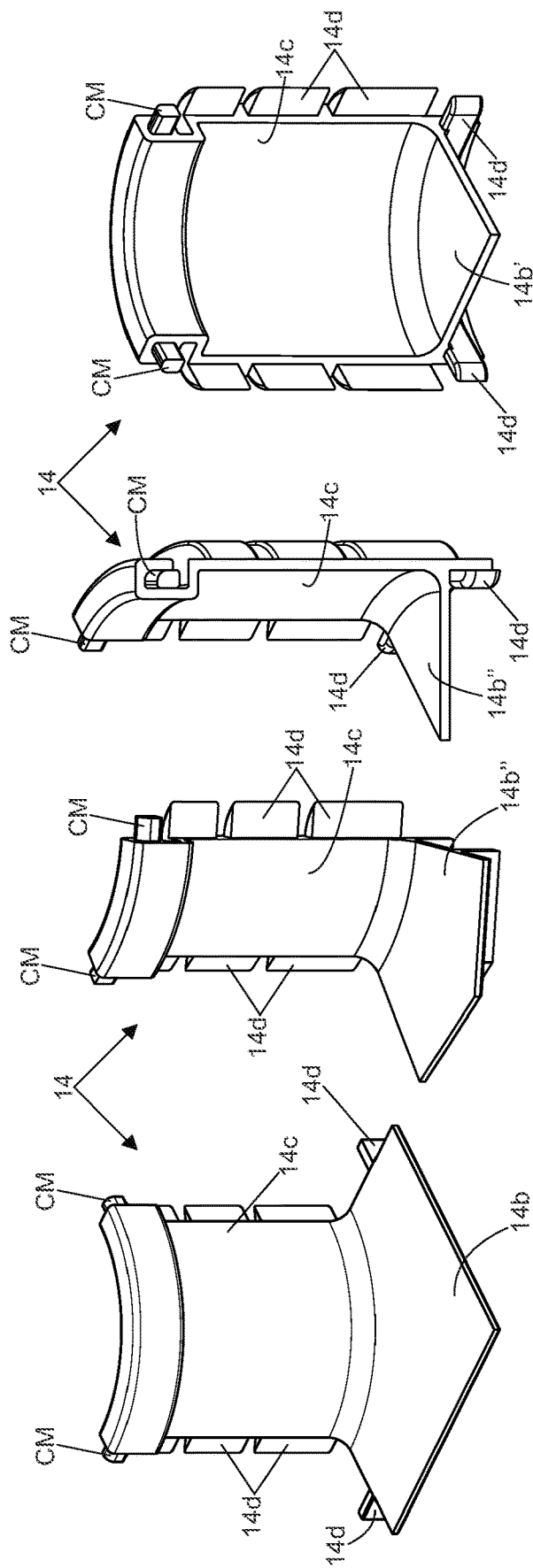
FIG. 1B shows a perspective view of the splice models.
Figure 1C:
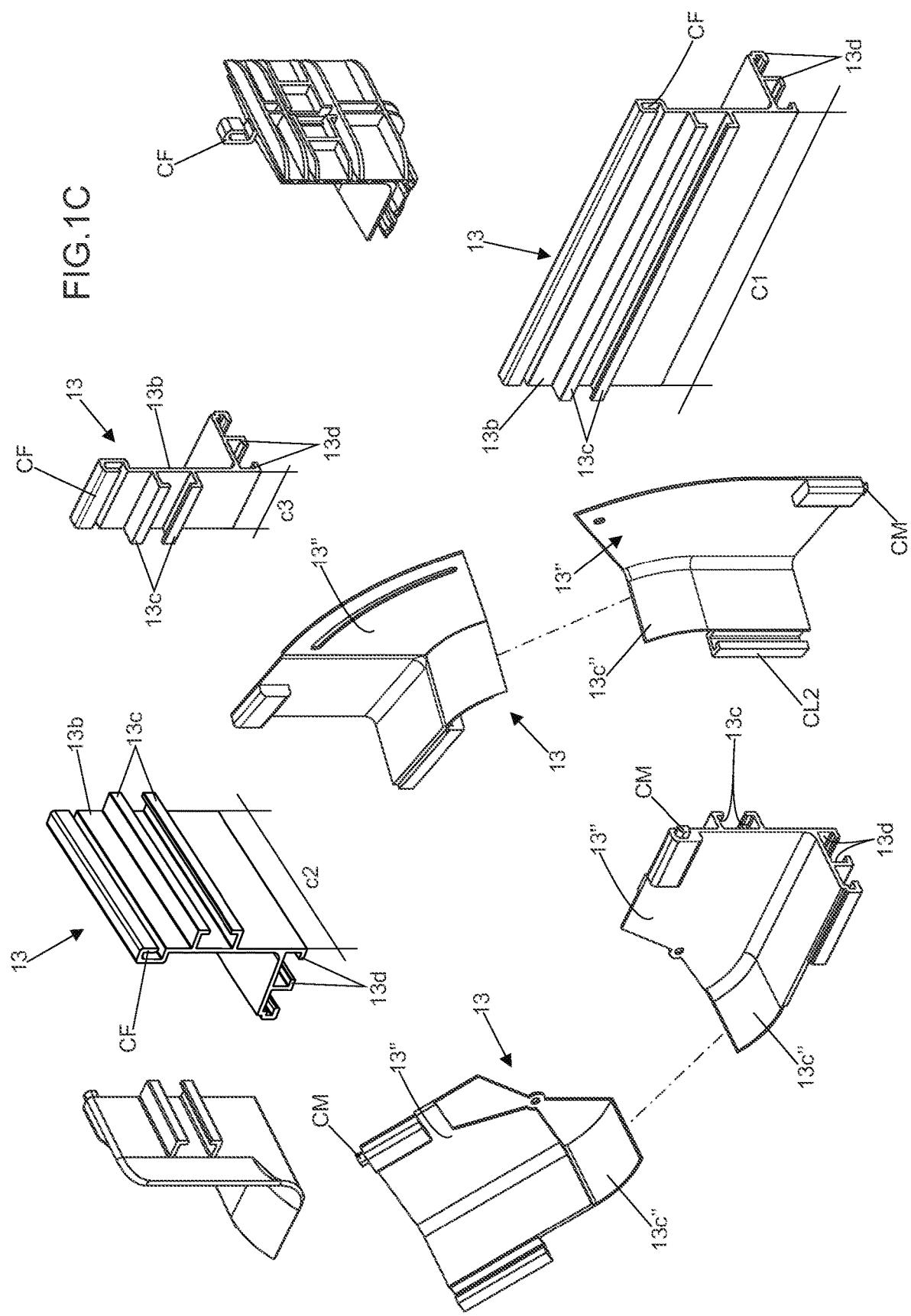
FIG. 1C represents perspective views of the end profile models.
Figure 1D:
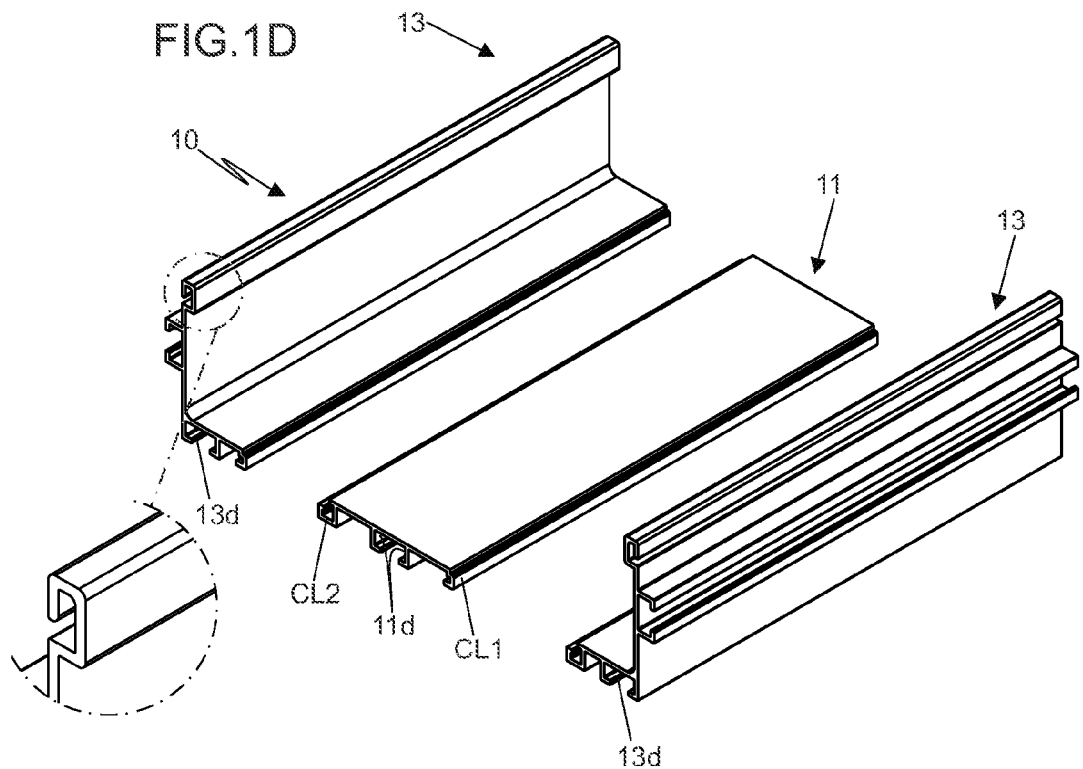
FIG. 1D shows a perspective view of the bed-type expandable module model illustrating the end and central profiles exploded from each other.
Figure 1E:
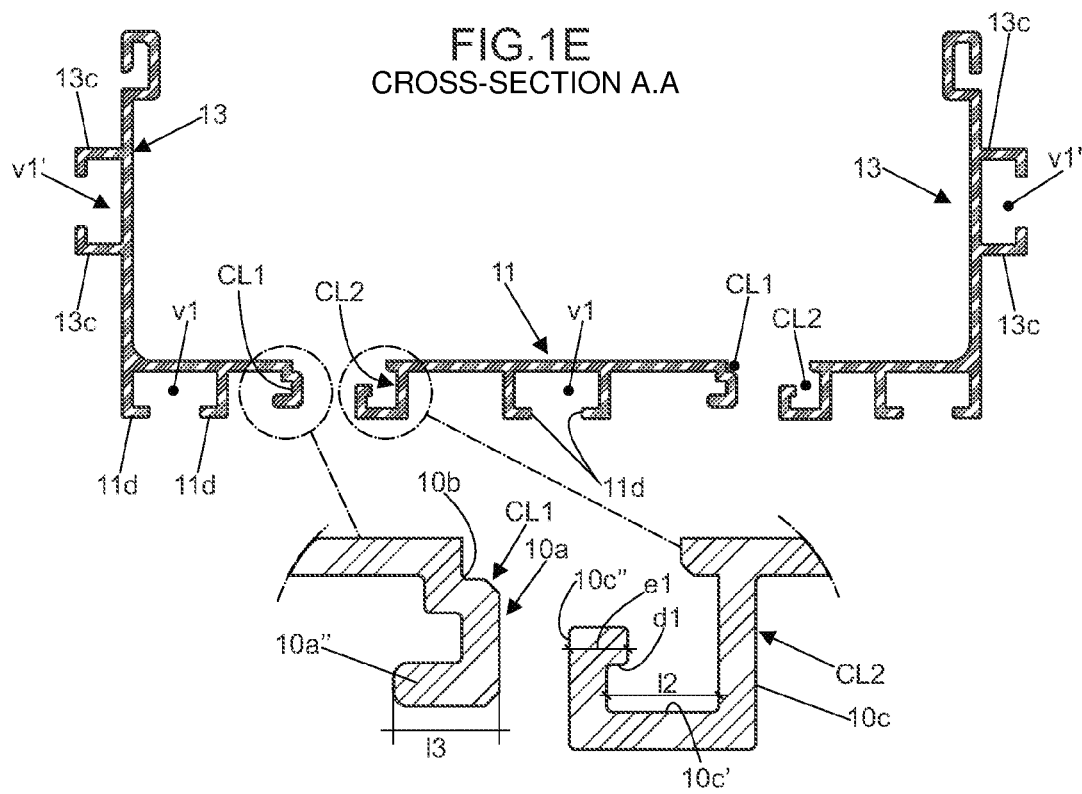
FIG. 1E shows a cross-sectional view A.A indicated in the previous figure, illustrating the end and central profiles exploded together.
Figure 1F:
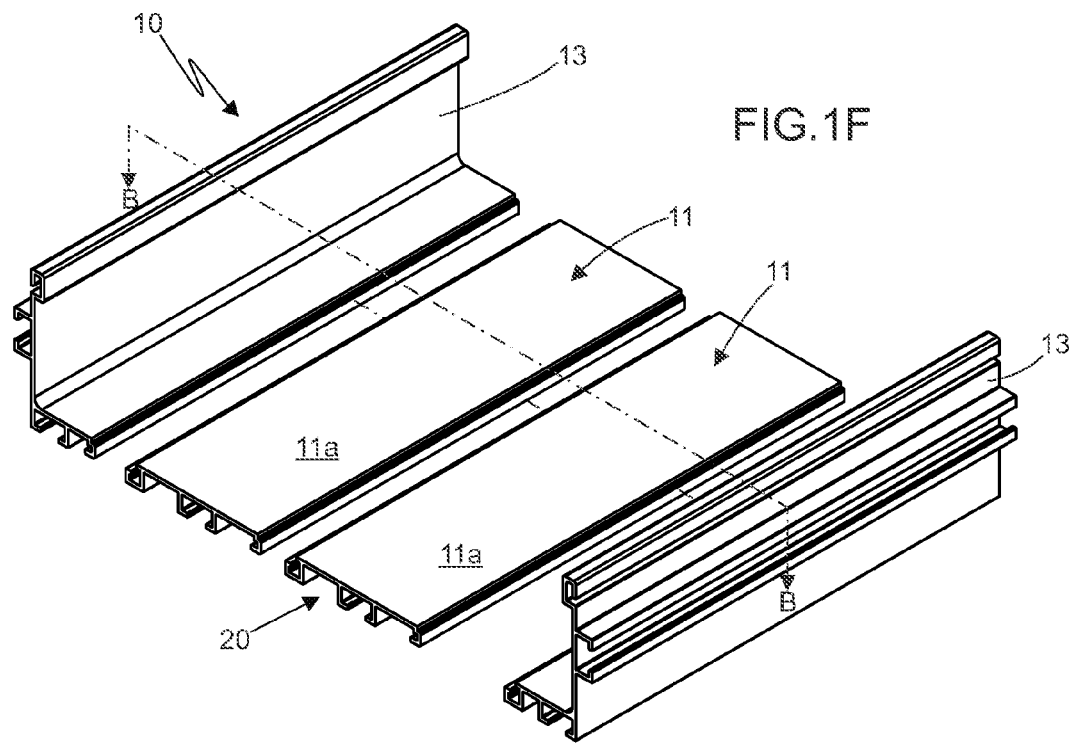
FIG. 1F shows a perspective view of the bed-type expandable module model, illustrating the expansion through the assembly of central profiles.
Figure 1G:
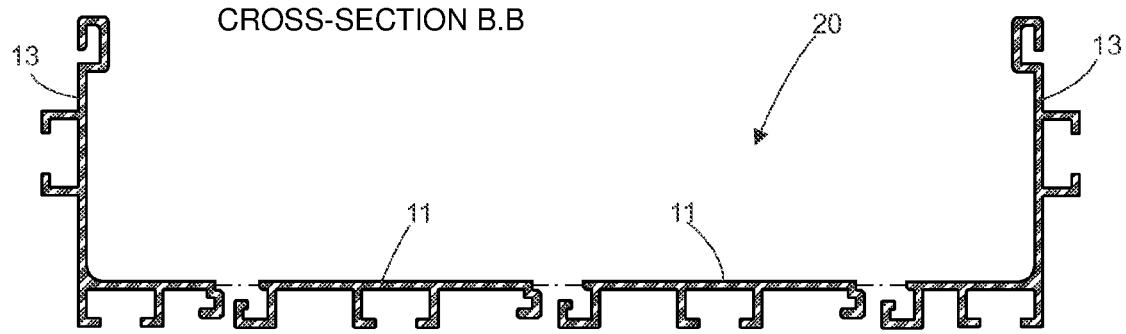
FIG. 1G illustrates a cross-sectional view B.B indicated in the previous figure, illustrating the expansion through the assembly of central profiles.
Figure 1H:
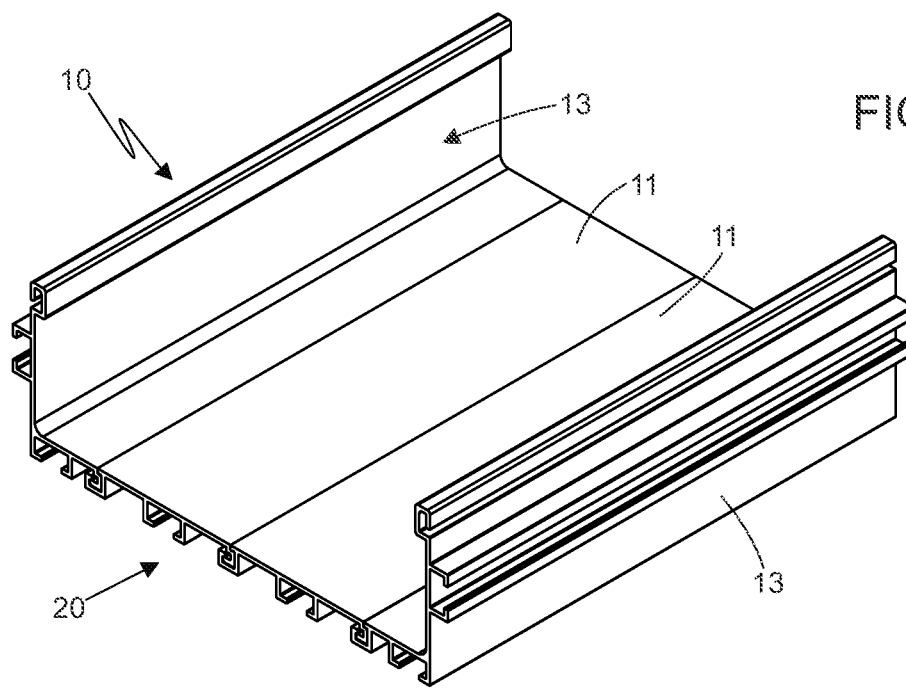
FIG. 1H shows a perspective view of the assembled bed-type expandable module model.
Figure 1I:
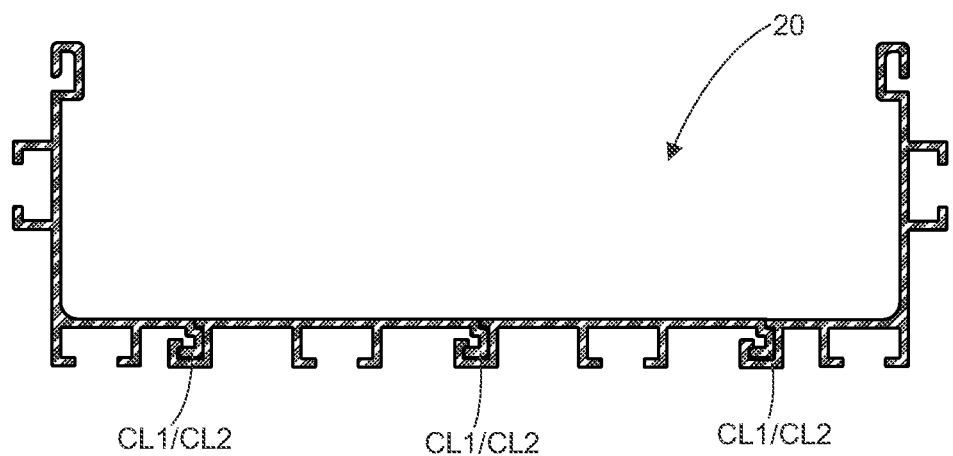
FIG. 1I represents a front view of the assembled bed-type expandable module.

According to the present invention, modules (20), (30), (40), (50), (60), (70), (80), (90), (110), (111) and (112) that make up the set of beds (10) are preferably made of polymers such as Acrylonitrile Butadiene Styrene—ABS—and Polyvinyl Chloride—PVC—or in metals, such as Aluminum Alloys, in addition to other flame-retardant materials and are subject to expansion because they are formed by at least one central profile (11) (see FIG. 1A) with pairs of longitudinal connections (CL1) and (CL2) for coupling in end profiles (13) (see FIG. 1C), each with corresponding connections base (CL1) and (CL2) (see FIG. 1B).

In a preferred constructive version, the longitudinal connection (CL1) corresponding to the connection (CL2) is formed by a coupling member (10*a*) with a mirrored 'L' section (see FIG. 1E) and provided with a longitudinal recess (10*b*) that composes a step for the accommodation or not of the edge of the central profile (11) to be assembled, while the connection (CL2) (see FIG. 1E) is formed by a locking member (10*c*) with a 'J' cross-section whose portion flat (10*c*') has a greater width (12) in relation to the width (13) of the flat portion (10*a*") of the coupling member (10*a*) and provides for an orthogonal end (10*c*") provided with greater thickness (e1) in order to compose a locking tooth (dt) to engage the flat portion (10*a*").

In a preferred constructive version, (see FIG. 1A), said central profile (11) is comprised of a plate (11*a*) of widths (11) and straight edges (11*b*), chamfered (11*b*'), of Inverted 'V' (11*b*"), as well as, may have a central 'V' cutout (11*c*"). Said central profile (11) provides that the extreme lateral edges are formed by the complementary longitudinal connections (CL1) and (CL2) for the assembly of the extreme profiles (13). Between the complementary longitudinal connections (CL1) and (CL2) of each central profile (11) 'L' section walls (11*d*) are projected in order to compose spans (v1) (see FIGS. 1E and 1G) for the assembly of wiring or similar (not shown).

Said end profiles (13) basically have an 'L' section (see FIG. 1C) whose extreme edge of the orthogonal wall (13*b*) is formed by a mirrored 'C' bending, composing the female connection (CF) for mounting in male-type connection (CM) formed by an oblong projection that develops from the edge with greater thickness provided for in modules (70), (80) and (110), as well as, from the external surface, a pair of projecting walls in 'L' (13c). Said profile (13) can be presented in a straight shape with length (c1) or reduced lengths (c2) or (c3), formed by two complementary parts (13") with arched bases (13c") of smaller thickness.

The assembly of the profiles (13)/(13')/(13") through the connections (CL1), (CL2), (CM) and (CF) in one or more central profile (11) provided or not of splices (14) make up the expansion or reduction of modules (20), (30), (40), (50), (60), (70), (80), (90), (110), (111).

Said splices (14) are comprised of single pieces of 'L' section with flat bases (14b) for connection at 90° angle or base (14b') for connection at 45° angle and bases (14b") for other angulations. From the bases (14b) (14b') and (14b"), arch walls (14c) are developed with varying widths and whose side edges are provided with locking members (14d) for mounting in spans (v1') formed by the equidistance of the 'L'-shaped walls (13c) (see FIG. 1C) provided for in the end profiles (13), in addition to being able to have lower stops (14d).

In the extreme portions of the upper edges of the splices (14) male connections (CM) are provided.

Said drip pan (112) is comprised of two complementary parts, being a base (112a) with an inverted 'U' section with low-height surrounding walls (112b), as well as one of the ends being wider and from which side flaps (112c) develop. In the enlarged wall, an oblong cutout (112d) is provided for coupling a complementary part (112'), in turn, formed by an oblong tubular extension (112a') provided with an enlarged end portion (112b').

It is certain that when the present invention is put into practice, modifications may be introduced with regard to certain details of construction and form, without this implying departing from the fundamental principles that are clearly substantiated in the claim framework, remaining thus understood that the terminology employed was not intended to be limiting.

The invention claimed is:

1. A set of modular beds, comprising:
a plurality of beds (10), each of beds (10) comprising a bed module (20) capable of receiving, through lateral coupling, at least one crossbar-type module (30) or at least one T-branch module (40); a 45° curve module (50) and a 90° curve module (60) which are coupled to the sides of two bed modules (20) whose ends are juxtaposed through complementary angulation; a 90° to 45° descent module (70) and a 90° to 45° ascent module (80) capable of coupling to the distal end of at least one bed module (20); a left reduction module (90) comprising coupling means at the distal end of at least one module (20); a nozzle-type module (110) and a splice-type module (111) arranged as a coupling between two bed modules (20); a drip module (112) comprising an attachable accessory as the final end of a bed module (20); characterized by the modules (20), (30), (40), (50), (60), (70), (80), (90), (110), (111), and (112) that compose the set of beds (10) being capable of expansion in both length and width and comprising at least one central profile (11) with pairs of longitudinal connections (CL1) and (CL2) for coupling to end profiles (13), each with corresponding base connections (CL1) and (CL2); the longitudinal connection (CL1) corresponds to connection (CL2), which is formed by an engagement member (10a) with an inverted L-shaped section and provided with a longitudinal recess (10b) that forms a step for the edge of the central profile (11) to be assembled, while the connection (CL2) is formed by a locking member (10c) with a J-shaped cross-section, whose flat portion (10c') has a greater width (L2) compared to the width (L3) of the flat portion (10a") of part of the engagement member (10a) and features an orthogonal end (10) with increased thickness (e1) to form a locking tooth (dt) for engaging the flat portion (10a); the central profile (11) comprises a plate (11a) with widths (11) and extreme straight edges (11b), chamfered (11b'), in an inverted V-shape (11b), and also features a central V-shaped cutout (11c); said central profile (11) provides that the extreme lateral edges are formed by complementary longitudinal connections (CL1) and (CL2) for the assembly of end profiles (13); between the complementary longitudinal connections (CL1) and (CL2) of each central profile (11), L-section walls (11d) protrude to form gaps (v1).

2. The set of modular beds according to claim 1, characterized by the end profiles (13) having an L-section, whose extreme edge of an orthogonal wall (13b) is formed by a folded C-shaped mirror, composing a female-type connection (CF) for assembly in a male-type connection (CM) formed by an oblong projection that develops from the thicker edge provided in the modules (70), (80), and (110), as well as featuring from the outer surface a pair of L-shaped projecting walls (13c); wherein said profile (13) may be presented in a straight form with length (c1) or reduced lengths (c2) or (c3), formed by two complementary parts (13) with arched bases (13c) of lesser thickness.

3. The set of modular beds according to claim 2, further comprising splice beds (14) being L-section components with flat bases (14b) for connection at a 90° angle or base (14b') for connection at a 45° angle and bases (14b) for other angles; from the bases (14b), (14b'), and (14b), arc walls (14c) develop with varied widths and whose lateral edges feature locking members (14d) for assembly in gaps (v1') formed by the equidistant L-shaped walls (13c) provided in the end profiles (13), in addition to possibly featuring lower locks (14d); at the extreme portions of the upper edges of the splice beds (14), male connections (CM) are provided.

4. The set of modular beds according to claim 1, characterized in that the drip edge module (112) is comprised of two complementary pieces, one being a U-inverted base (112a) with surrounding low-height walls (112b), as well as one end being wider and from which lateral flanges (112c) develop; an oblong cutout (112d) is made in the widened wall for coupling a complementary piece (112'), in turn, formed by an oblong tubular extension (112a') provided with a widened extreme portion (112b').

* * * * *